US012242971B2

(12) United States Patent
Liu et al.

(10) Patent No.: US 12,242,971 B2
(45) Date of Patent: Mar. 4, 2025

(54) ADVERSARIAL TRAINING OF MACHINE LEARNING MODELS

(71) Applicant: Microsoft Technology Licensing, LLC, Redmond, WA (US)

(72) Inventors: Xiaodong Liu, Bellevue, WA (US); Jianfeng Gao, Woodinville, WA (US); Pengcheng He, Sammamish, WA (US); Weizhu Chen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 889 days.

(21) Appl. No.: 16/775,635

(22) Filed: Jan. 29, 2020

(65) Prior Publication Data

US 2021/0142181 A1 May 13, 2021

Related U.S. Application Data

(60) Provisional application No. 62/932,324, filed on Nov. 7, 2019.

(51) Int. Cl.
 *G06N 3/088* (2023.01)
 *G06N 3/045* (2023.01)
(52) U.S. Cl.
 CPC ............. *G06N 3/088* (2013.01); *G06N 3/045* (2023.01)
(58) Field of Classification Search
 CPC ......... G06N 3/088; G06N 3/0454; G06N 3/08
 See application file for complete search history.

(56) References Cited

U.S. PATENT DOCUMENTS

| 9,659,248 B1* | 5/2017 | Barbosa ................. G06N 3/045 |
| 9,990,687 B1* | 6/2018 | Kaufhold ............. G06K 9/6247 |
| 11,429,862 B2* | 8/2022 | Chai ..................... G06N 3/0454 |
| 2016/0350655 A1* | 12/2016 | Weiss .................... G06N 3/044 |

(Continued)

FOREIGN PATENT DOCUMENTS

CN        108509596 A        9/2018

OTHER PUBLICATIONS

Panda, P., Chakraborty, I., & Roy, K. (2019). Discretization based solutions for secure machine learning against adversarial attacks. IEEE Access, 7, 70157-70168. (Year: 2019).*

(Continued)

*Primary Examiner* — Ryan C Vaughn
(74) *Attorney, Agent, or Firm* — Rainier Patents, P.S.

(57) ABSTRACT

This document relates to training of machine learning models such as neural networks. One example method involves providing a machine learning model having one or more layers and associated parameters and performing a pretraining stage on the parameters of the machine learning model to obtain pretrained parameters. The example method also involves performing a tuning stage on the machine learning model by using labeled training samples to tune the pretrained parameters. The tuning stage can include performing noise adjustment of the labeled training examples to obtain noise-adjusted training samples. The tuning stage can also include adjusting the pretrained parameters based at least on the labeled training examples and the noise-adjusted training examples to obtain adapted parameters. The example method can also include outputting a tuned machine learning model having the adapted parameters.

23 Claims, 13 Drawing Sheets

(56) References Cited

U.S. PATENT DOCUMENTS

| | | | |
|---|---|---|---|
| 2018/0041536 A1* | 2/2018 | Berlin | H04L 63/1416 |
| 2019/0287515 A1* | 9/2019 | Li | G06N 3/084 |
| 2019/0347515 A1* | 11/2019 | Kehl | G06F 18/23 |
| 2020/0057807 A1* | 2/2020 | Kapur | G06N 3/045 |
| 2020/0153921 A1* | 5/2020 | Kolluri Venkata Sesha | H04L 67/10 |
| 2020/0365270 A1* | 11/2020 | Kazemi Oskooei | G06N 3/08 |
| 2021/0109958 A1* | 4/2021 | Behtash | G06F 18/214 |

OTHER PUBLICATIONS

Miyato et al., "Virtual Adversarial Training: A Regularization Method for Supervised and Semi-Supervised Learning," in 41.8 IEEE Transactions on Pattern Analysis and Machine Intelligence 1979-93 (2019). (Year: 2019).*

Wang et al., "Proximal Deep Structured Models," in Advances in Neural Info. Processing 29 (2016). (Year: 2016).*

Papernot et al., "Practical Black-Box Attacks against Machine Learning," in Proc. 2017 ACM on Asia Conf. on Computer and Comms. Security 506-19 (2017). (Year: 2017).*

Drawings for U.S. Appl. No. 62/914,669, filed Oct. 14, 2019. (Year: 2019).*

Li et al., "Story Ending Prediction by Transferable BERT," in arXiv preprint arXiv: 1905.07504 (2019). (Year: 2019).*

Bentivogli, et al., "The Fifth Pascal Recognizing Textual Entailment Challenge", In Proceedings of The Text Analysis Conference, Nov. 17, 2009, 18 Pages.

Bowman, et al., "A Large Annotated Corpus for Learning Natural Language Inference", In Proceedings of the Conference on Empirical Methods in Natural Language Processing, Sep. 17, 2015, pp. 632-642.

Caruana, Rich, "Multitask Learning", In the Journal of Machine Learning, vol. 28, Issue 1, Jul. 1, 1997, pp. 41-75.

Cer, et al., "Semeval-2017 Task 1: Semantic Textual Similarity-Multilingual And Cross-Lingual Focused Evaluation", In Repository of arXiv:1708.00055, Jul. 31, 2017, 14 Pages.

Cooper, et al., "BERT And PALs: Projected Attention Layers for Efficient Adaptation in Multi-Task Learning", In Repository of arxiv:1902.02671v1, Feb. 7, 2019, 11 Pages.

Dagan, et al., "The PASCAL Recognising Textual Entailment Challenge", In Proceedings of the First International Conference on Machine Learning Challenges: Evaluating Predictive Uncertainty Visual Object Classification, and Recognizing Textual Entailment, Apr. 11, 2005, 8 Pages.

Devlin, et al., "BERT: Pre-training of Deep Bidirectional Transformers for Language", In Journal of Computing Research Repository, Oct. 11, 2018, 14 Pages.

Dolan, et al., "Automatically Constructing a Corpus of Sentential Paraphrases", In Proceedings of the Third International Workshop on Paraphrasing, Oct. 2005, pp. 9-16.

Dong, et al., "Unified Language Model Pre-Training for Natural Language Understanding And Generation", In Repository of arXiv:1905.03197v1, May 8, 2019, 13 Pages.

French, et al., "Self-Ensembling for Visual Domain Adaptation", In Repository of arXiv:1706.05208v1, Jun. 16, 2017, 15 Pages.

Giampiccolo, et al., "The Third PASCAL Recognizing Textual Entailment Challenge", In Proceedings of The ACL-PASCAL Workshop on Textual Entailment and Paraphrasing, Jun. 28, 2007, pp. 1-9.

Haim, et al., "The Second PASCAL Recognising Textual Entailment Challenge", In Proceedings of The Second PASCAL Challenges Workshop on Recognising Textual Entailment, Jan. 2006, 9 Pages.

Hendrycks, et al., "Using Self-Supervised Learning Can Improve Model Robustness and Uncertainty", In Repository of arXiv:1906.12340v1.pdf, Jun. 28, 2019, 11 Pages.

Houlsby, et al., "Parameter-Efficient Transfer Learning for NLP", In Repository of arXiv:1902.00751v1, Feb. 2, 2019, 12 Pages.

Howard, et al., "Universal Language Model Fine-tuning for Text Classification", In Repository of arXiv:1801.06146, May 23, 2018, 12 Pages.

Jiang, et al., "SMART: Robust and Efficient Fine-Tuning for Pre-trained Natural Language Models through Principled Regularized Optimization", In Repository of arxiv:1911.03437, Nov. 8, 2019, 12 Pages.

Joshi, et al., "SpanBERT: Improving Pre-Training By Representing and Predicting Spans", In Repository of arXiv:1907.10529v1, Jul. 24, 2019, 12 Pages.

Khot, et al., "SciTail: A Textual Entailment Dataset from Science Question Answering", In Proceedings of the Thirty-Second AAAI Conference on Artificial Intelligence, Apr. 27, 2018, pp. 5189-5197.

Kingma, et al., "ADAM: A Method for Stochastic Optimization", In Repository of arXiv:1412.6980, Jan. 30, 2017, 15 Pages.

Lan, et al., "ALBERT: A Lite Bert For Self-Supervised Learning Of Language Representations", In Repository of arXiv:1909.11942v1, Sep. 26, 2019, 16 Pages.

Levesque, et al., "The Winograd Schema Challenge", In Proceedings of The Thirteenth International Conference on the Principles of Knowledge Representation and Reasoning, May 17, 2012, pp. 552-561.

Liu, et al., "Improving Multi-Task Deep Neural Networks via Knowledge Distillation for Natural Language Understanding", In Repository of arXiv:1904.09482, Apr. 20, 2019, 8 Pages.

Liu, et al., "Multi-Task Deep Neural Networks for Natural Language Understanding", In Proceedings of The 57th Annual Meeting of the Association for Computational Linguistics, Jul. 28, 2019, pp. 4487-4496.

Liu, et al., "On the Variance Of The Adaptive Learning Rate And Beyond", In Repository of arXiv:1908.03265, Aug. 8, 2019, 14 Pages.

Liu, et al., "Representation Learning using Multi-Task Deep Neural Networks for Semantic Classification and Information Retrieval", In Proceedings of The Conference of the North American Chapter of the Association for Computational Linguistics: Human Language Technologies, May 31, 2015, pp. 912-921.

Liu, et al., "ROBERTa: A Robustly Optimized BERT Pretraining Approach.", In Repository of arXiv:1907.11692, Jul. 26, 2019, 13 Pages.

Liu, et al., "Stochastic Answer Networks for Natural Language Inference", In Repository of arXiv:1804.07888, Apr. 21, 2018, 5 pages.

Madry, et al., "Towards Deep Learning Models Resistant to Adversarial Attacks", In Repository of arXiv:1706.06083, Jun. 19, 2017, 22 Pages.

Miyato, et al., "Virtual Adversarial Training: A Regularization Method for Supervised And Semi-supervised Learning", In Proceedings of the IEEE Transactions on Pattern Analysis and Machine Intelligence, vol. 41, Issue 8, Aug. 2019, pp. 1979-1993.

Pan, et al., "A Survey on Transfer Learning", Published in Journal of IEEE Transactions on Knowledge and Data Engineering, vol. 22, Issue 10, Oct. 2010, pp. 1345-1359.

Peters, et al., "Deep Contextualized Word Representations", In Repository of arXiv:1802.05365, Feb. 15, 2018, 15 Pages.

Peters, et al., "To Tune or Not To Tune? Adapting Pretrained Representations to Diverse Tasks", In Repository of arXiv:1903.05987v1, Mar. 14, 2019, 8 Pages.

Qin, et al., "Adversarial Robustness Through Local Linearization", In Repository of arxiv:1907.02610v1, Jul. 4, 2019, 17 Pages.

Radford, et al., "Language Models Are Unsupervised Multitask Learners", Published in OpenAI Blog, vol. 1, Issue 8, Feb. 2019, 24 Pages.

Raffel, et al., "Exploring The Limits of Transfer Learning with A Unified Text-To-Text Transformer", In Repository of arxiv:1910.10683v1, Oct. 23, 2019, 52 Pages.

Rajpurkar, et al., "SQUAD: 100,000+ Questions for Machine Comprehension of Text", In Proceeding of the Conference on Empirical Methods in Natural Language Processing, Nov. 1, 2016, pp. 2383-2392.

Rockafellar, Tyrrell R.., "Monotone Operators And the Proximal Point Algorithm", In Journal of SIAM on Control and Optimization, vol. 14, Issue 5, Aug. 1976, pp. 877-898.

(56) References Cited

OTHER PUBLICATIONS

Schulman, et al., "Trust Region Policy Optimization", In Proceedings of the International Conference on Machine Learning, Jun. 1, 2015, 9 Pages.
Shafahi, et al., "Adversarial Training for Free!", In Repository of arxiv:1904.12843v1, Apr. 29, 2019, 14 Pages.
Shu, et al., "A Dirt-T Approach to Unsupervised Domain Adaptation", In Repository of arxiv:1802.08735v1, Feb. 23, 2018, 19 Pages.
Socher, et al., "Recursive Deep Models for Semantic Compositionality Over a Sentiment Treebank", In Proceedings of the Conference on Empirical Methods in Natural Language Processing, Oct. 18, 2013, pp. 1631-1642.
Tarvainen, et al., "Mean Teachers Are Better Role Models: Weight-Averaged Consistency Targets Improve Semi-Supervised Deep Learning Results", In Proceedings of the Advances in Neural Information Processing Systems, Dec. 4, 2017, 10 Pages.
Vaswani, et al., "Attention is All You Need", In Proceedings of Advances in Neural Information Processing Systems, Dec. 4, 2017, 11 Pages.
Wang, et al., "GLUE: A Multi-Task Benchmark and Analysis Platform for Natural Language Understanding", In Repository of arxiv:1804.07461v1, Apr. 20, 2018, 14 pages.
Wang, et al., "StructBERT: Incorporating Language Structures into Pre-Training For Deep Language Understanding", In Repository of arxiv:1908.04577v1, Aug. 13, 2019, 9 Pages.
Warstadt, et al., "Neural Network Acceptability Judgments", In Repository of arxiv:1805.12471v1, May 31, 2018, 15 Pages.
Williams, et al., "A Broad-Coverage Challenge Corpus for Sentence Understanding through Inference", In Proceedings of the Conference of the North American Chapter of the Association for Computational Linguistics: Human Language Technologies, vol. 1, Jun. 1, 2018, pp. 1112-1122.
Xie, et al., "Unsupervised Data Augmentation For Consistency Training", In Repository of arxiv:1904.12848v2, Jul. 10, 2019, 20 Pages.
Xu, et al., "Robustness and Generalization", In Journal of The Machine Learning, vol. 86, Issue 3, Nov. 15, 2011, pp. 391-423.
Yang, et al., "XLNet: Generalized Autoregressive Pretraining for Language Understanding", In Repository of arXiv:1906.08237v1, Jun. 19, 2019, 18 Pages.
"International Search Report and Written Opinion Issued in PCT Application No. PCT/US20/056235", Mailed Date: Feb. 25, 2021, 11 Pages.
Varkarakis, et al., "Deep neural network and data augmentation methodology for off-axis iris segmentation in wearable headsets", In Journal of the Neural Networks, vol. 121, Aug. 1, 2019, pp. 101-121.
Zhang, et al., "I Know What You Want: Semantic Learning for Text Comprehension", In Repository of arxiv:1809.02794v1, Sep. 8, 2018, 9 Pages.
Zhang, et al., "Theoretically Principled Trade-Off Between Robustness and Accuracy", In Repository of arxiv:1901.08573v1, Jan. 24, 2019, 30 Pages.
Zhu, et al., "FreeLB: Enhanced Adversarial Training for Language Understanding.", In Repository of arxiv:1909.11764v1, Sep. 25, 2019, 11 Pages.
Devlin, et al., "BERT: Pre-training of Deep Bidirectional Transformers for Language Understanding," arXiv, arXiv:1810.04805v2 [cs.CL], May 24, 2019, 16 pages.
First Office Action Received for Chinese Application No. 202080077349.9, mailed on Dec. 31, 2024, 25 Pages (English Translation Provided).

\* cited by examiner

ADVERSARIAL TRAINING OF MACHINE LEARNING MODELS

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs. However, for many machine learning tasks, labeled training data is available in limited quantities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training of machine learning models. One example includes a method or technique that can be performed on a computing device. The method or technique can include providing a machine learning model having one or more layers and associated parameters. The method or technique can also include performing a pretraining stage on the parameters of the machine learning model to obtain pretrained parameters. The method or technique can also include performing a tuning stage on the machine learning model by using labeled training samples to tune the pretrained parameters. The tuning stage can include performing noise adjustment of the labeled training samples to obtain noise-adjusted training samples, and adjusting the pretrained parameters based at least on the labeled training samples and the noise-adjusted training samples to obtain adapted parameters. The method or technique can also include outputting a tuned machine learning model having the adapted parameters.

Another example includes a system having a hardware processing unit and a storage resource storing computer-readable instructions. When executed by the hardware processing unit, the computer-readable instructions can cause the hardware processing unit to receive input data, process the input data using a machine learning model having a first layer and a second layer to obtain a result, and output the result. The first layer can be pretrained in a pretraining stage, and the first layer and the second layer can be tuned together using virtual adversarial regularization.

Another example includes a system having a hardware processing unit and a storage resource storing computer-readable instructions. When executed by the hardware processing unit, the computer-readable instructions can cause the hardware processing unit to obtain a machine learning model and perform a supervised learning process on the machine learning model. The supervised learning process can include adjusting parameters of the machine learning model based at least on training loss over labeled training samples that include model inputs and corresponding labels. The supervised learning process can also include adjusting the parameters of the machine learning model based at least on deviations in model output of the machine learning model caused by adding noise to the model inputs.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Figure 1:
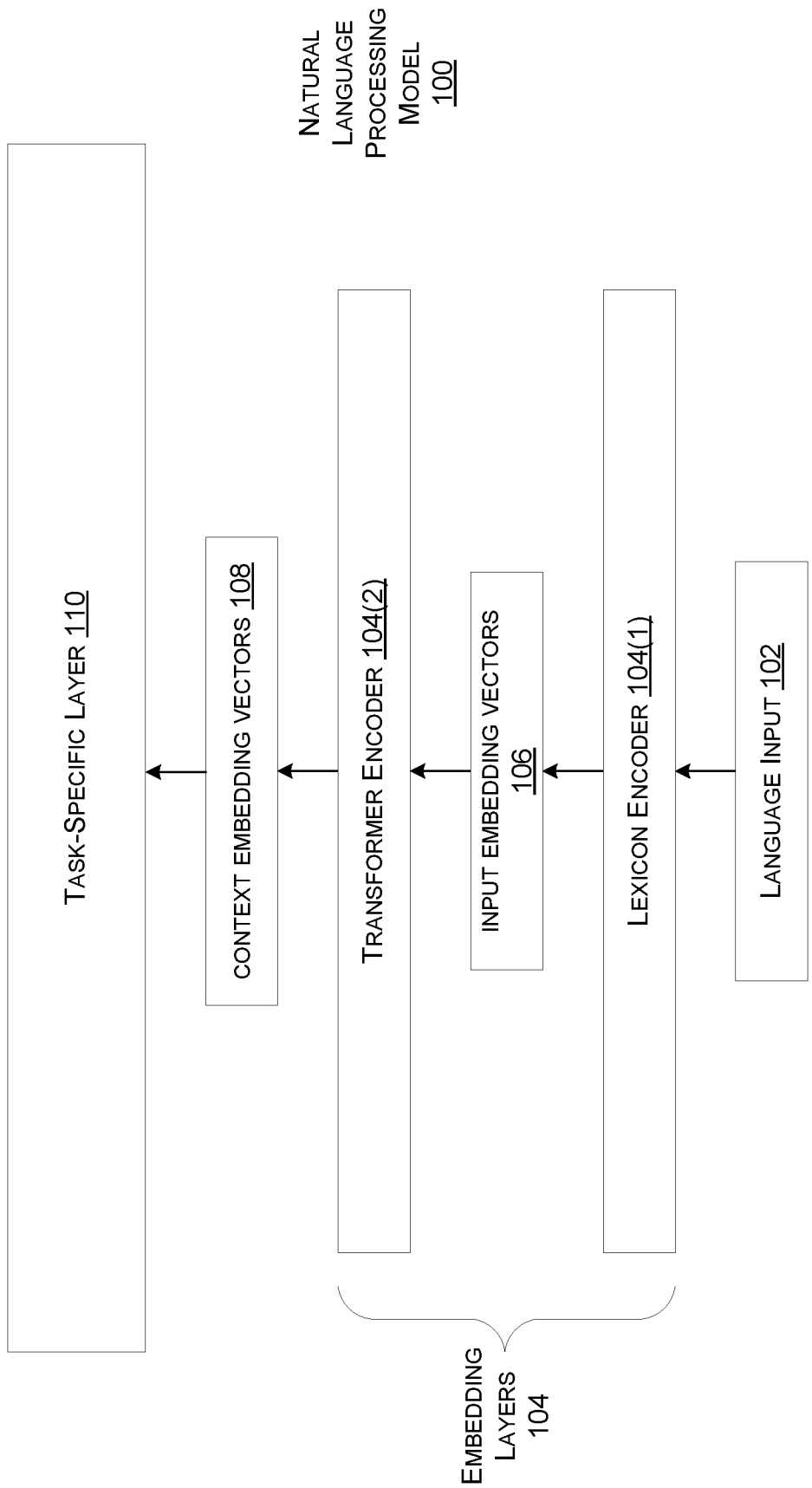
FIG. 1 illustrates an example machine learning model, consistent with some implementations of the present concepts.

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models trained on different training data or if there are underlying stochastic processes in the training process.

As noted previously, there are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data. However, conventional techniques for doing so tend to use aggressive tuning updates that can cause overfitting of the final model and/or knowledge forgetting, as discussed more below. The term "train," as used herein, encompasses both pretraining of a model as well as subsequent tuning updates, i.e., the term "train" encompasses any process that updates parameters of a model using labeled or unlabeled training examples.

As noted above, tuning a pretrained model to a limited set of task-specific training data with aggressive updates can overfit the model to the training data. When a model is overfit to a given set of training data, the model does not generalize well to new examples. In addition, aggressive updates can cause knowledge forgetting, where knowledge learned by the model during the pre-training process is lost during the tuning process. Various approaches have been used to address these tuning issues, such as using heuristic learning rates, freezing certain model layers for part of the tuning process, etc. These ad-hoc approaches have had some success but tend to involve a great deal of tuning effort by highly skilled machine learning experts.

The disclosed implementations offer several mechanisms to address the potential for model overfitting and knowledge forgetting. For instance, the disclosed implementations provide an adversarial regularization mechanism that can help mitigate overfitting of a model during a training or tuning process. As discussed more below, the adversarial regularization mechanism encourages the model to produce a smooth output function, e.g., an output function that does not change sharply for small perturbations in the input.

The disclosed implementations also provide a proximal point mechanism that can help prevent knowledge forgetting during training or tuning of a model. As discussed more below, the proximal point mechanism encourages the model to produce output that is similar to output of previous iterations of the model. In other words, for each training iteration, the proximal point update mechanism discourages large changes in the model parameters relative to one or more previous instances of the model from previous training iterations.

Taken together, the disclosed mechanisms can stabilize training or tuning of a machine learning model in a manner that mitigates overfitting and knowledge forgetting. The following discussion provides some specific examples in a natural language processing context. However, as also discussed further below, the disclosed techniques can also be employed for other tasks besides natural language processing, such as image recognition, financial analysis, etc.

Example Natural Language Processing Model

FIG. 1 illustrates an exemplary natural language processing model 100 that can be trained using the disclosed implementations. Natural language processing model 100 is an example of a machine learning model that can used to perform one or more natural language processing tasks, as discussed more below. For the purposes of this document, the term "natural language" means language that is normally used by human beings for writing or conversation.

Natural language processing model 100 can receive language input 102, which can include words, tokens, sentences, phrases, or other representations of language. The language inputs can be processed by layers 104, which include a lexicon encoder 104(1) and a transformer encoder 104(2). Generally, both the lexicon and transformer encoders operate to produce vectors that represent individual words, tokens, sentences, or phrases in a vector space where semantically-similar and/or syntactically-similar words, tokens, sentences, or phrases are relatively close to one another, and less semantically-similar or syntactically-similar words, sentences, tokens, or phrases are relatively further apart. These vectors are also referred to herein as "embeddings."

Lexicon encoder 104(1) can produce a sequence of input embedding vectors 106 for each word or token in the language input 102. An input to the lexicon encoder can be sequence of tokens of length m, $X=\{x_1, \ldots, x_m\}$. Specific tokens can be used to delineate the beginning of each sequence, and to separate individual sentences in a given sequence. The lexicon encoder can map X into a sequence of input embedding vectors, one for each token. In some implementations, the input embedding vectors are constructed by summing corresponding word, segment, and positional embeddings for each word.

Transformer encoder 104(2) can obtain contextual information for each word, e.g., via self-attention, and generate a sequence of context embedding vectors 108. Self-attention is a mechanism relating different positions of tokens within a sentence to compute the similarities between those tokens. In some implementations, the transformer encoder is a multilayer bidirectional transformer encoder that is configured to map the input embedding vectors 106 into the context embedding vectors. As discussed more below, the context embedding vectors can be used as a shared representation of the input phrases or sentences across different tasks. The context embedding vectors represent the words or tokens as well as the context within which each word or token appears in an underlying document, query, or other input. Note that both the lexicon encoder and the transformer encoder can be initialized using unsupervised techniques, and then subsequently updated by tuning using labeled data for a specific task.

The context embedding vectors 108 can be input to task-specific layer 110 to perform task-specific processing, as discussed more below. Task-specific layer 110 can evaluate the context embedding vectors 108 to produce a task-specific output. Note that the following examples of task-specific layer 110 are but a few examples of types of task-specific layers that can be employed.

In some implementations, the task-specific layer can be a single-sentence classification layer that can label a sentence using class labels. As one specific example, a single-sentence classification layer can predict whether an English sentence is grammatically plausible. Another example classification task is to determine whether the sentiment of a sentence extracted from movie reviews is positive or negative. As discussed more below, the output of a task-specific layer for a classification task can include a corresponding probability for each potential classification.

In other implementations, the task-specific layer 110 can be a pairwise text similarity layer that performs a regression task on a pair of input sentences. The regression task can involve outputting a real-valued similarity score indicating the semantic similarity of the two sentences.

In other implementations, the task-specific layer 110 can be a pairwise text classification layer that determines a relationship between a pair of input sentences, where the relationship is selected from a set of pre-defined labels. For example, the labels can indicate whether one input sentence has an entailment relationship, a contradiction relationship, or a neutral relationship with respect to the other input sentence.

In other implementations, the task-specific layer 110 can be a relevance ranking layer that outputs a relevance score that conveys the relevance of two input items, e.g., the relevance of a document to a query. The relevance scores can be used in a subsequent natural language processing operation to rank the candidate answers in the order of relevance to the query.

Example Training Workflow

Figure 2:
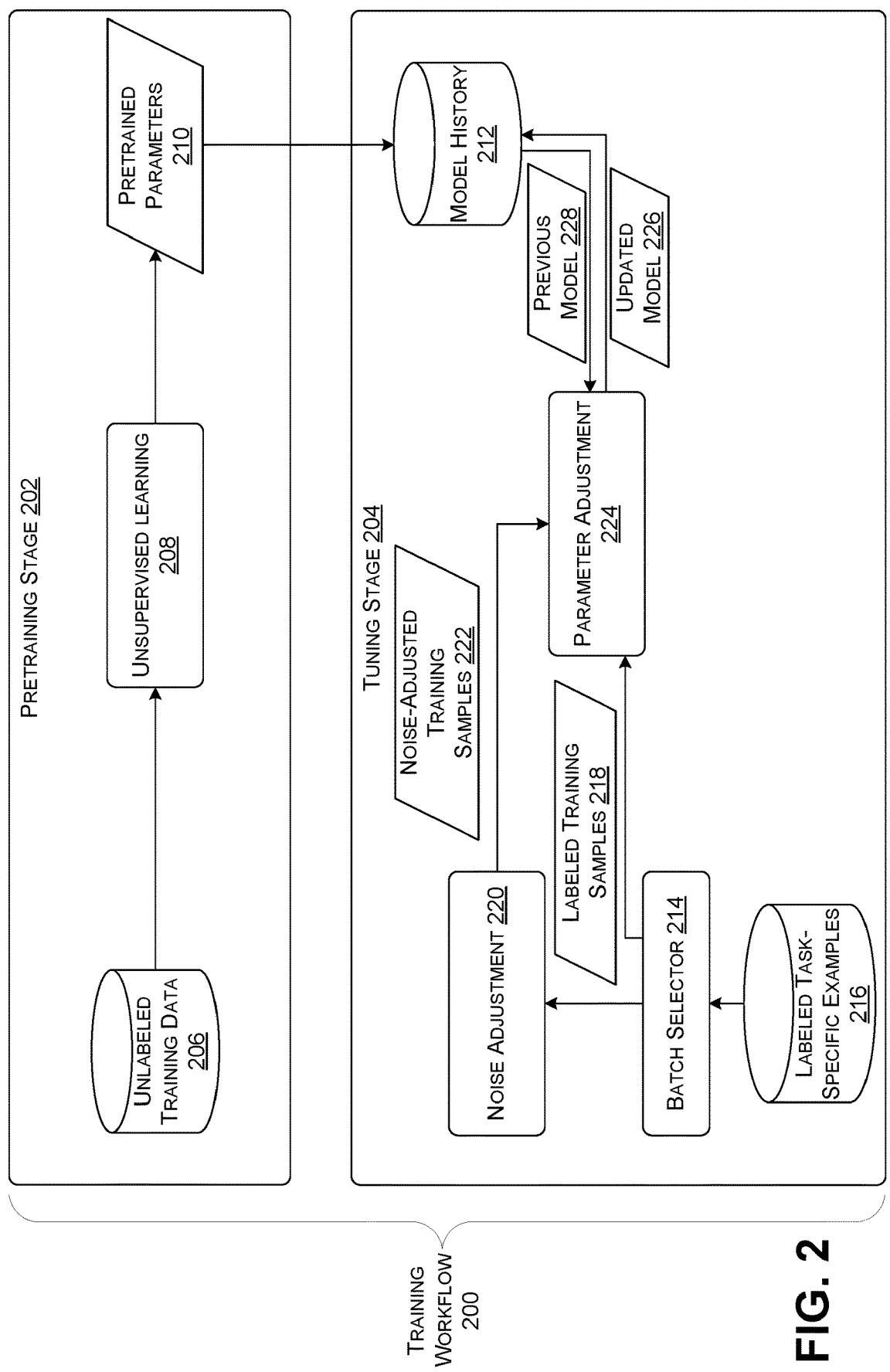
FIG. 2 illustrates an example training workflow for training a machine learning model, consistent with some implementations of the present concepts.

FIG. 2 illustrates an example training workflow 200 for training of a machine learning model, consistent with some implementations. The training workflow is described using the natural language processing model 100 shown in FIG. 1 as an example model, but the training workflow can be performed on many different types of machine learning models.

Training workflow 200 can include a pretraining stage 202 and a tuning stage 204. As discussed more below, the pretraining stage can be used to determine pretrained parameters for one or more layers of a machine learning model, and the tuning stage can be used to adapt those pretrained parameters to a particular task. As also described more below, in some cases the tuning stage is applied to one or more additional layers that are not initialized during the pretraining stage.

In some implementations, the pretraining stage 202 can utilize unlabeled training data 206 to perform unsupervised learning 208. The unsupervised learning can output pretrained parameters 210. For instance, the unlabeled training data can provide an unlabeled corpus of documents in a given natural language. The embedding layers 104 can be pretrained by unsupervised learning to predict tokens in the corpus. One approach involves masking tokens and training the embedding layers to predict the masked tokens bidirectionally, e.g., left-to-right and next tuning iteration can proceed by retrieving the previous model 228 from the model history 212 and continuing with tuning iterations until a stopping condition is reached, e.g., the model converges, achieves a threshold accuracy on a test data set, a training budget is exhausted, and/or all of the labeled task-specific examples 216 have been exhausted.

Algorithmic Details of Parameter Adjustment

In some implementations, the parameter adjustment process 224 in training workflow 200 utilizes an adversarial regularization mechanism and a proximal point update mechanism. The adversarial regularization mechanism can utilize explicit regularization to effectively control model complexity. Specifically, given a model $f(\cdot;\theta)$ and n data points of a target task (e.g., a batch of labeled task-specific examples) denoted by $\{(x_i,y_i)\}_{i=1}^n$, where $x_i$'s denote the embedding of the input sentences obtained from the first embedding layer of the language model and $y_i$'s are the associated labels, the disclosed implementations can solve the following optimization for fine-tuning:

$$\min_\theta (\theta) = (\theta) + \lambda_s{}_s(\theta) \qquad (1)$$

where $(\theta)$ is a training loss term defined as:

$$(\theta) = \frac{1}{n}\sum_{i=1}^n \ell(f(x_i;\theta), y_i)$$

and $l(\cdot,\cdot)$ is the loss function depending on the target task, $\lambda_s > 0$ is a tuning parameter, and $_s(\theta)$ is the smoothness-inducing adversarial regularizer. $_s(\theta)$ can be defined as:

$$_s(\theta) = \frac{1}{n}\sum_{i=1}^n \max_{\|\tilde{x}_i-x_i\|_p \le \epsilon} \ell_s(f(\tilde{x}_i;\theta), f(x_i;\theta))$$

where $\epsilon > 0$ is a tuning parameter. Note that for classification tasks, $f(\cdot;\theta)$ outputs a probability simplex and $l_s$ can be chosen as the symmetrized KL-divergence, i.e., positive, this still counts as a single missed label for purposes of calculating training loss $(\theta)$. Thus, $(\theta)$ is proportional to the total number of missed labels for a given batch, irrespective of the underlying probabilities output by the model.

In contrast, the term $_s(\theta)$ is proportional to a difference between model outputs for a given labeled training sample and its noise-adjusted counterpart. Thus, for instance, assume the model outputs values of 0.6 negative, 0.4 positive for sentiment of a given training sample, and also estimates 0.6 negative, 4 positive for the noise-adjusted counterpart. In this case, $_s(\theta)$ is zero, because the model duplicated its output for both samples, and this is true irrespective of the label for that training sample. In contrast, $_s(\theta)$ would be non-zero if the model output different values (e.g., 0.55, 0.45) for the noise-adjusted sample than for the retrieved training sample. Moreover, $_s(\theta)$ is proportional to that difference, e.g., $_s(\theta)$ increases as the output of the model for the noise-adjusted samples deviates further from the output of the model for the actual training examples within a given batch. The term "virtual adversarial regularization" is used herein to refer to various mechanisms that adjust model parameters by considering how model outputs change when noise is added to model input. The term "virtual" applies when model outputs, rather than labels of training samples, are used for training purposes.

Many different approaches can be used to solve equation (1), i.e., to calculate the next set of model parameters using a given batch of training data. In some cases, aggressively updating model parameters can result in knowledge forgetting, e.g., the model parameters for a given training batch can move too far away from the previous model parameters in a manner that is detrimental to the utility of the next iteration of the model.

The following describes a proximal point update mechanism to solve (1) that can be used to mitigate the consequences of aggressive model updating. The proximal point update mechanism can impose a penalty at each tuning iteration. Starting with the first iteration of the model denoted by $f(\cdot;\theta_0)$, for the (t+1)-th training iteration:

$$\theta_{t+1} = _\theta(\theta) + \mu_{Breg}(\theta, \theta_t), \quad (2)$$

where $\mu > 0$ is a tuning parameter, and $_{Breg}(\cdot,\cdot)$ is the Bregman divergence defined as $$_{Breg}(\theta, \theta_t) = \frac{1}{n}\sum_{i=1}^{n}\ell_s(f(x_i;\theta), f(x_i;\theta_t)),$$

where $l_s$ is defined as above. As can be seen, when $\mu$ is large, the Bregman divergence at each tuning iteration can serve as a strong regularizer and prevent the next set of model parameters $\theta_{t+1}$ from deviating too much from the parameters of the previous iteration $\theta_t$. Consequently, the proximal point update mechanism can effectively retain the knowledge of out-of-domain data (e.g., the unlabeled training data 206) obtained by pre-training the model. Note that equation (2) can be solved using a stochastic gradient descent algorithm such as Diederik Kingma and Jimmy Ba., "*ADAM: A Method for Stochastic Optimization*," in arXiv preprint arXiv:1412.6980v9.

The proximal point update mechanism can be accelerated by introducing an additional momentum to the update. Specifically, at the (t+1)-th iteration, the momentum Bregman proximal point (MBPP) method takes:

$$\theta_{t+1} = _\theta(\theta) + \mu_{Breg}(\theta, \tilde{\theta}_t), \quad (3)$$

where $\tilde{\theta}_t = (1-\beta)\theta_t + \beta\tilde{\theta}_{t-1}$ and $\beta \in (0,1)$ is the momentum parameter.

As noted above, the disclosed proximal point mechanism can prevent the new model parameters $\theta_{t+1}$ from deviating too much from the model parameters from the previous iteration, $\theta_t$. In other words, the adjusting of the model parameters is constrained based on the difference between output of the current model iteration and the output of at least one previous iteration of the model. In some instances, the proximal point mechanism can maintain an overall average of previous model instances by averaging individual parameters over each iteration, and use the average previous model to constrain the parameter updating in the next tuning iteration.

Algorithmic Pseudocode

The following provides pseudocode of a specific algorithm that can be used to implement the parameter adjustment process 224 using a smoothness-inducing adversarial regularizer with $p=\infty$ and the momentum Breaman proximal point method. For notational simplicity, denote $$g_i(\tilde{x}_i, \overline{\theta}_s) = \frac{1}{|B|}\sum_{k_i \in B}\nabla_{\tilde{x}}\ell_s(f(x_i;\overline{\theta}_s), f(\tilde{x}_i;\overline{\theta}_s))$$

and AdamUpdate$_B$ denotes the update rule of the ADAM method for optimizing (3) using the mini-batch B; $\Pi_A$ denotes the projection to A.

Input: T: the total number of iterations; X: the dataset, $\theta_0$: the parameter of the pre-trained model, S: the total number of iterations for solving (2), $\sigma^2$: the variance of the random initialization for $\tilde{x}_i$'s, $T_{\tilde{x}}$: the number of iterations for updating $\tilde{x}_i$'s, $\eta$: the learning rate for updating $\tilde{x}_i$'s, $\beta$: momentum parameter.

```
 1: θ̃₁ ← θ₀
 2: for t = 1, ..., T do
 3:    θ̄₁ ← θ_{t-1}
 4:    for s = 1, ..., S do
 5:       Sample a mini-batch B from X
 6:       For all xᵢ ∈ B, initialize x̃ᵢ ← xᵢ + vᵢ with vᵢ ~ N(0, σ²I)
 7:       for m = 1, ..., T_x̃ do
 8:          
              ĝᵢ ← g_i(x̃_i, θ̄_s) / ||g_i(x̃_i, θ̄_s)||_∞

9:          x̃ᵢ ← Π_{||x̃ᵢ-x||_∞ ≤ ε}(x̃ᵢ + η ĝᵢ)
10:       end for
11:       θ̄_{s+1} ← AdamUpdate_B(θ̄_s)
12:    end for
13:    θ_t ← θ̄_S
14:    θ̃_{t+1} ← (1 - β)θ̄_S + β θ̃_t
15: end for
Output: θ_T
```

Example Model Output Characteristics

One potential benefit of the disclosed implementations involves the disclosed adversarial regularization mechanism. In adversarial training, a model is encouraged to duplicate predictions (e.g., labels) for noise-adjusted inputs. In contrast, the disclosed techniques can provide a virtual adversarial regularization training mechanism that encourages the model to duplicate model outputs for the noise-adjusted samples. Specifically, the regularization term $\lambda_{s_s}(\theta)$ encourages the model training to favor model parameters that tend to produce smooth model output distributions. This can help avoid model overfitting that could occur if the model were trained using only the training loss, e.g., by omitting the regularization term from equation (1).

Another potential benefit of the disclosed implementations involves the use of a proximal point mechanism for updating model parameters. The proximal point mechanism can help avoid knowledge forgetting that might occur with more aggressive model updates, e.g., by favoring the creation of new models that are relatively similar to models from previous training iterations. Note, however, that the disclosed regularization techniques can also be employed without the proximal point update mechanism, e.g., using with more aggressive and/or conventional model updating techniques.

Figure 3A:
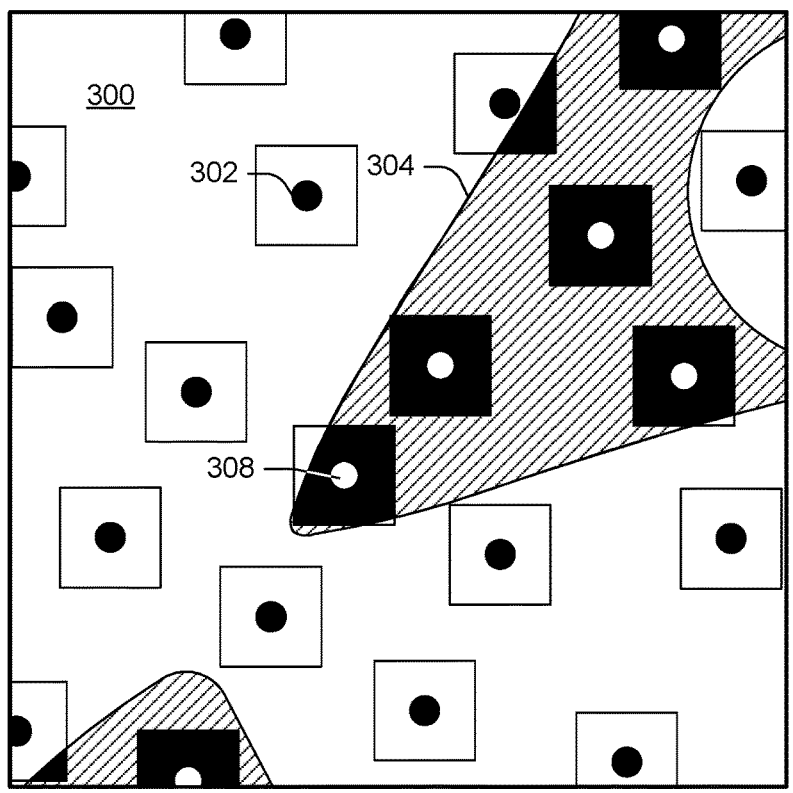
FIGS. 3A and 3B provide graphical representations of model output distributions, consistent with some implementations of the present concepts.
Figure 3B:
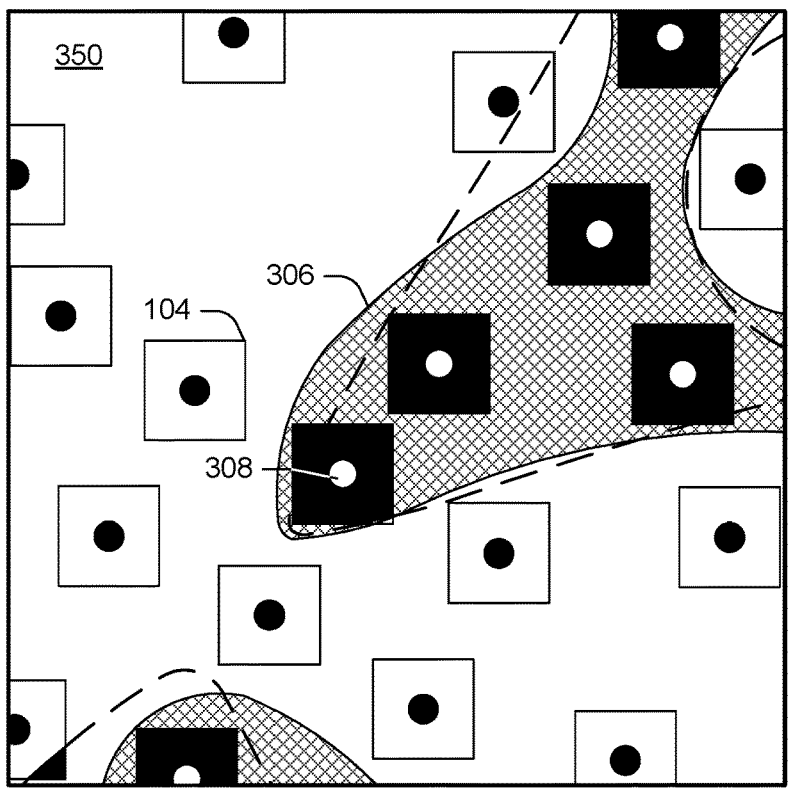

FIGS. 3A and 3B provide a visual illustration of how the disclosed mechanisms can produce relatively smooth output distributions for a trained model. FIG. 3A illustrates a visualization 300 of an output function learned using training loss without the disclosed adversarial regularization and proximal point mechanisms, and FIG. 3B illustrates a visualization 350 of another output function learned using training loss with the disclosed adversarial regularization and proximal point mechanisms.

In FIGS. 3A and 3B, each training data point is represented by a corresponding dot 302. FIG. 3A shows a decision boundary 304 learned by training a machine learning model via training loss over labeled training data. FIG. 3B shows another decision boundary 306 learned using both loss over labeled training data as well as the disclosed adversarial regularization and proximal point mechanisms. FIG. 3B shows decision boundary 304 as a dotted line for comparison purposes.

As can be seen in comparing the two figures, decision boundary 304 is relatively sharp in the vicinity of training data point 308, whereas decision boundary 306 tapers broadly around this training data point. Thus, decision boundary 306 encompasses a wider range of neighboring data points around training data point 308. Intuitively, this follows from the fact that the model has been trained in a manner that encourages similar model outputs for labeled inputs and corresponding noise-adjusted inputs in the vicinity of the training examples.

Example Multi-Task Architecture

Figure 4:
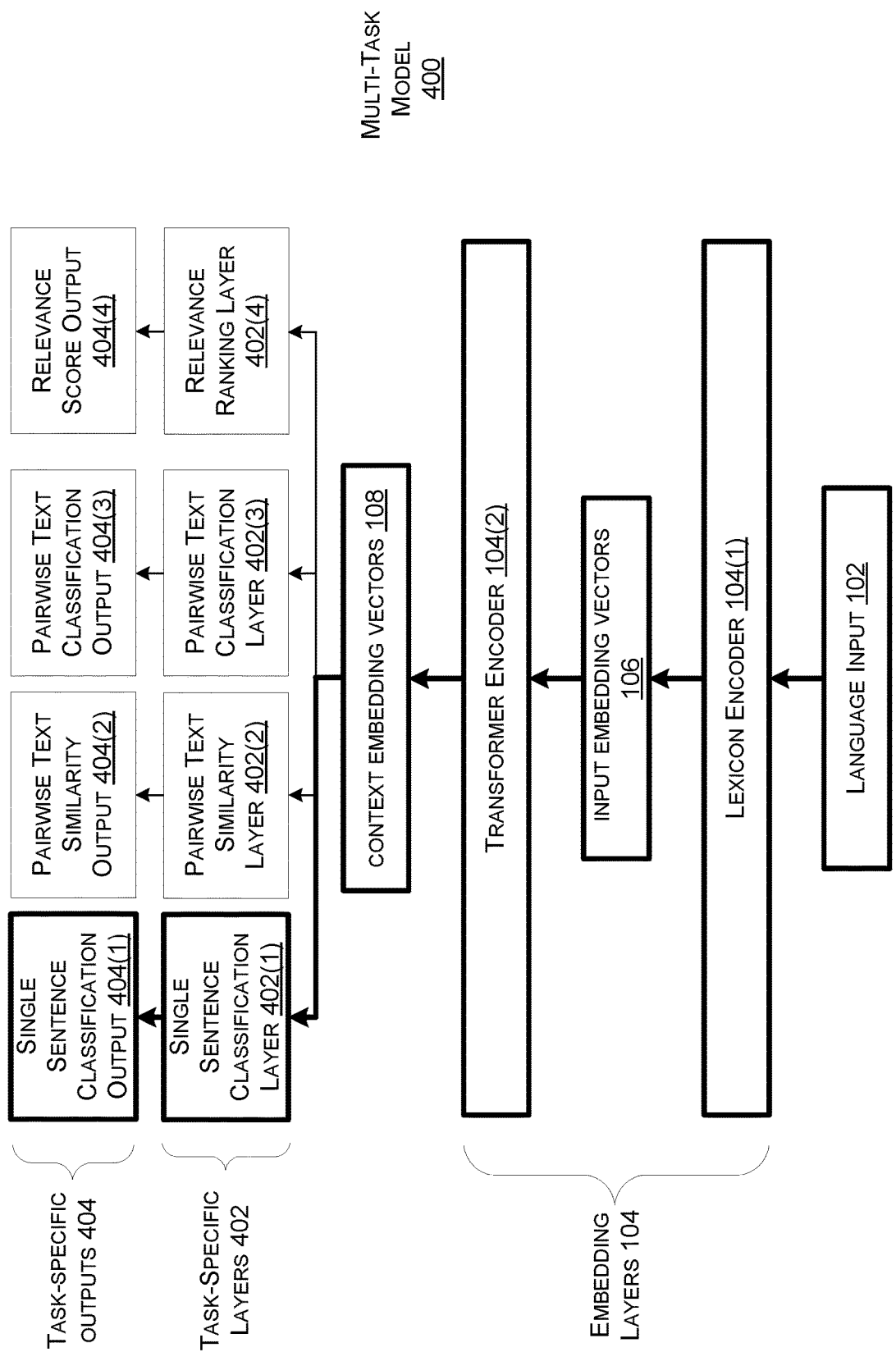
FIG. 4-7 illustrate an example multi-task machine learning model, consistent with some implementations of the present concepts.

In some implementations, the disclosed adversarial regularization and proximal point mechanisms can be employed to train models with multi-task architectures. FIG. 4 illustrates an example multi-task model 400 that can be trained using the disclosed techniques.

Multi-task model 400 can share certain components of natural language processing model 100, such as the lexicon encoder 104(1) and transformer encoder 104(2) and inputs and outputs thereof. A description of these components is provided above with respect to FIG. 1 and therefore not duplicated here. In place of the task-specific layer 110 shown in FIG. 1, the multi-task model can have multiple task-specific layers 402, including a single-sentence classification layer 402(1), a pairwise text similarity layer 402(2), a pairwise text classification layer 402(3), and/or a relevance ranking layer 402(4). Respectively, these task-specific layers can output a single sentence classification output 404(1), a pairwise text similarity output 404(2), a pairwise text classification output 404(3), and/or a relevance score output 404(4).

Training of the multi-task model 400 can proceed in a manner similar to that discussed above with respect to training workflow 200 shown in FIG. 2, modified as described below. The labeled task-specific examples 216 can include different sets of labeled training examples for training each of the task-specific layers. In other words, the layered task-specific examples can include multiple batches of labeled training data for the single-sentence classification layer 402(1), multiple batches of labeled training data for pairwise text similarity layer 402(2), multiple batches of labeled training data for the pairwise text classification layer 402(3), and/or multiple batches of labeled training data for the relevance ranking layer 402(4).

During the tuning stage, the batch selector 214 can first select a batch of labeled single-sentence classification training data, and the parameter adjustment process 224 can be performed by propagating loss as calculated using output of the single-sentence classification layer 402(1) for this batch. Next, the batch selector 214 can select a batch of labeled pairwise text similarity training data, and the parameter adjustment process 224 can be performed by propagating loss as calculated using output of the pairwise text similarity layer 402(2) for this batch. Next, the batch selector 214 can select a batch of labeled pairwise text classification training data, and the parameter adjustment process 224 can be performed by propagating loss as calculated using output of the pairwise text classification layer 402(3) for this batch. Next, the batch selector 214 can select a batch of labeled pairwise relevance ranking training data, and the parameter adjustment process 224 can be performed by propagating loss as calculated using output of the pairwise relevance ranking layer 402(4) for this batch.

At this point, the tuning stage 204 can be performed on each of the task-specific layers in sequence again using further batches of appropriate training data. This process can continue over several iterations until the tuning stage is complete.

FIG. 4-7 illustrate how different components of multi-task natural language processing model 400 are active during training, depending on which task-specific layer 402 is being trained. Assume there are four labeled sets of training data—a first training data set of single sentences labeled with correct classifications, a second training data set with pairs of sentences labeled to reflect their semantic similarity, a third training data set with pairs of sentences labeled to reflect entailment, neutral, and/or contradiction relations, and a fourth training data set with sentences that are labeled to indicate whether they contain correct answers to a given query.

FIG. 4 shows how training can proceed with the first training data set, which can be used to train single-sentence classification layer 402(1). The components of multi-task natural language processing model 400 that are active during training using the first data set are shown in bold in FIG. 4. The first training data set is fed into the embedding layers 104, and the context embedding vectors 108 produced from the first training data set are used by single-sentence classification layer 402(1) to produce single-sentence classification output 404(1). The parameters of single-sentence classification layer 402(1), lexicon encoder 104(1), and transformer encoder 104(2) can be updated using the disclosed adversarial regularization and proximal point mechanisms. Note that parameters of the other task specific layers, pairwise text similarity layer 402(2), pairwise text classification layer 402(3), and relevance ranking layer 402(4), are not updated using the first training data set.

Figure 5:
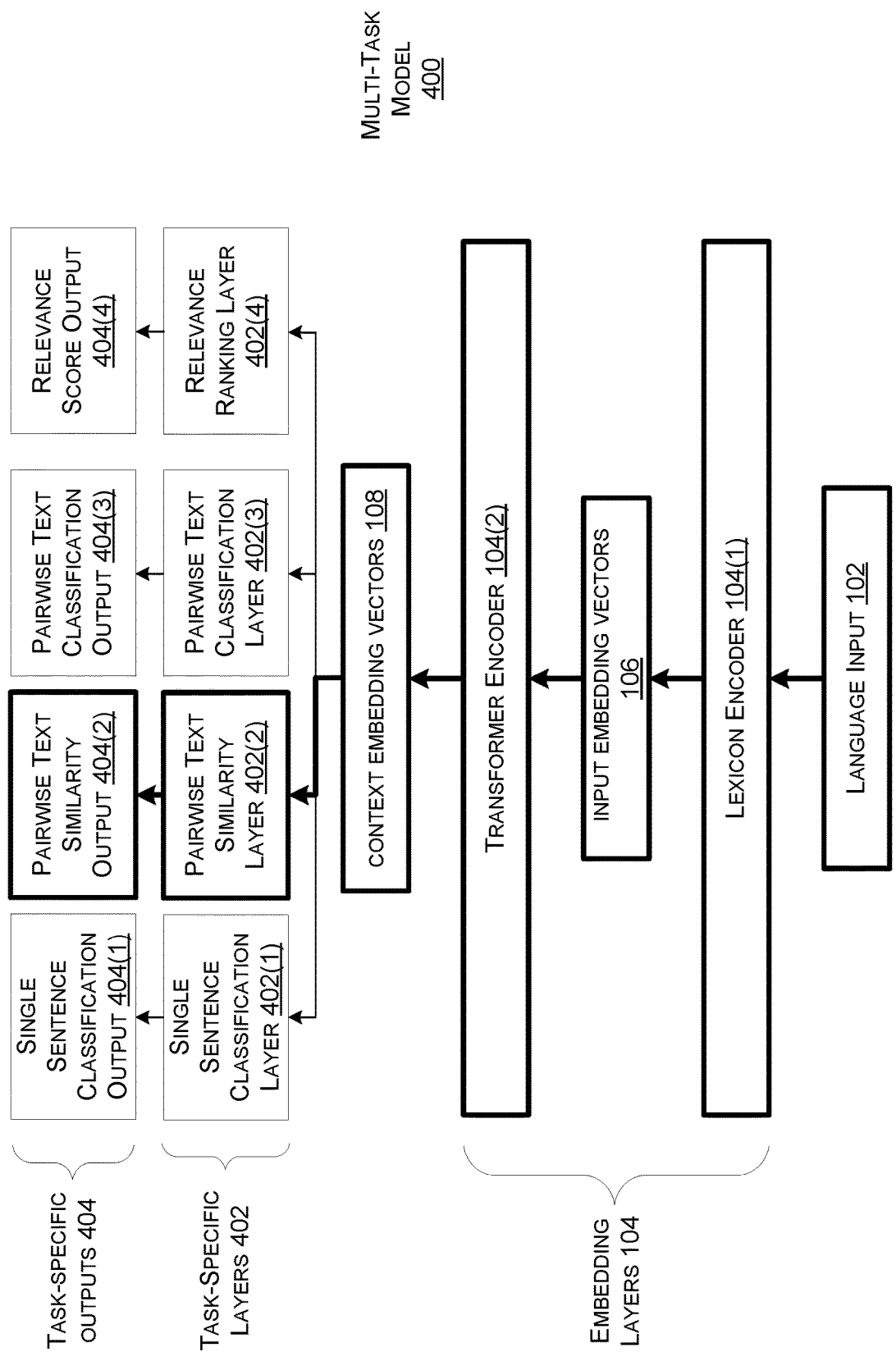

FIG. 5 shows how training can proceed with the second training data set, which can be used to train pairwise text similarity layer 402(2). Again, the components of multi-task natural language processing model 400 that are active during training using the second training data set are shown in bold. The second training data set is fed into the embedding layers 104, and the context embedding vectors 108 produced from the second training data set are used by pairwise text similarity layer 402(2) to produce pairwise text similarity layer output 404(2). Generally, the parameters of pairwise text similarity layer 402(2), lexicon encoder 104(1), and transformer encoder 104(2) can be updated using the disclosed adversarial regularization and proximal point mechanisms. Note that the other task specific layers, single sentence classification layer 402(1), pairwise text classification layer (3), and relevance ranking layer 402(4), are not updated using the second training data set.

Figure 6:
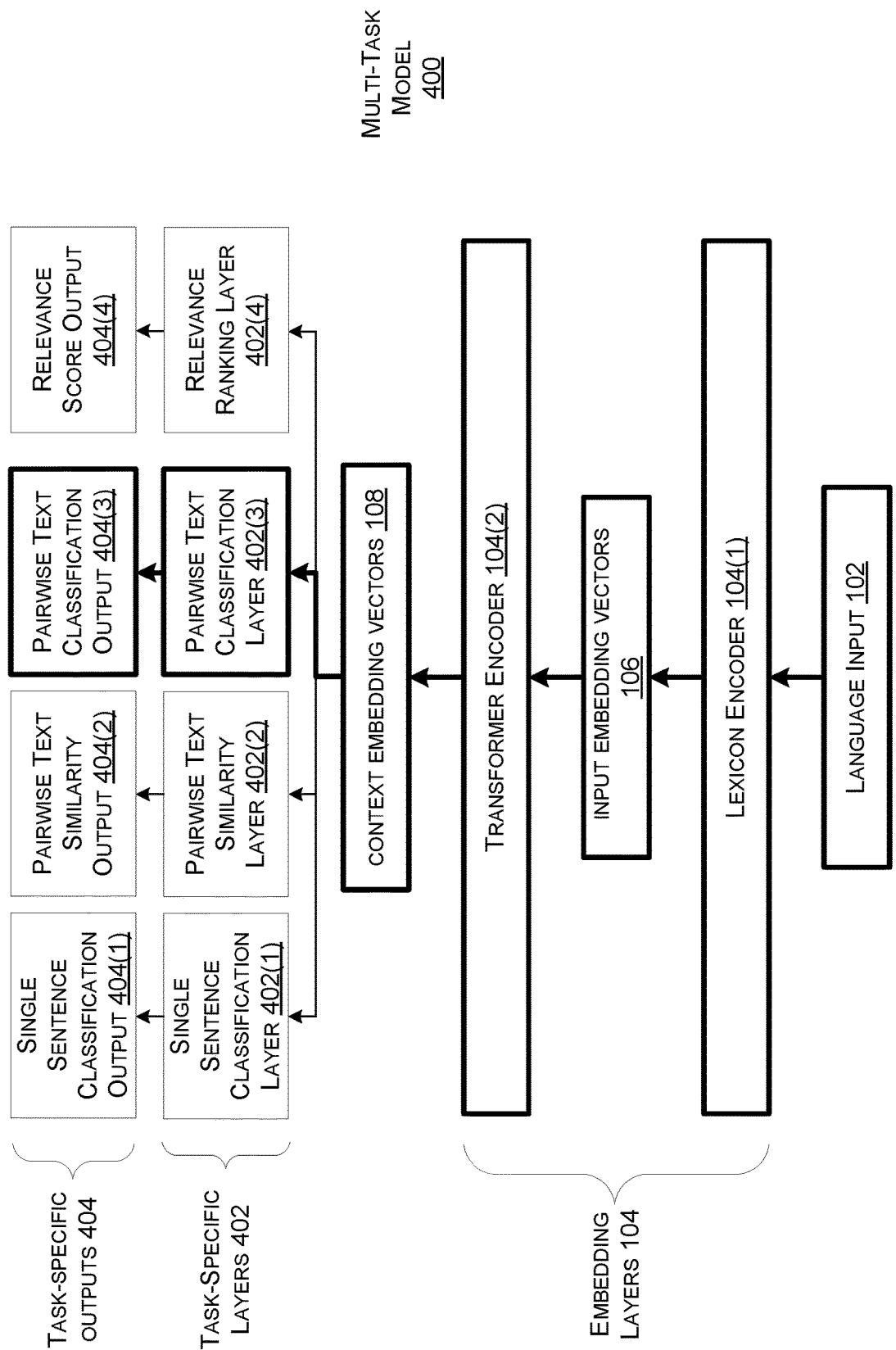

FIG. 6 shows how training can proceed with the third training data set, which can be used to train pairwise text classification layer 402(3). Again, the components of multi-task natural language processing model 400 that are active during training using the third training data set are shown in bold. The third training data set is fed into the embedding layers 104, and the context embedding vectors 108 produced from the third training data set are used by pairwise text classification layer 402(3) to produce pairwise text classification layer output 404(3). Generally, the parameters of pairwise text classification layer 402(3), lexicon encoder 104(1), and transformer encoder 104(2) can be updated using the disclosed adversarial regularization and proximal point mechanisms. Note that the other task specific layers, single sentence classification layer 402(1), pairwise text similarity layer(2), and relevance ranking layer 402(4), are not updated using the third training data set.

Figure 7:
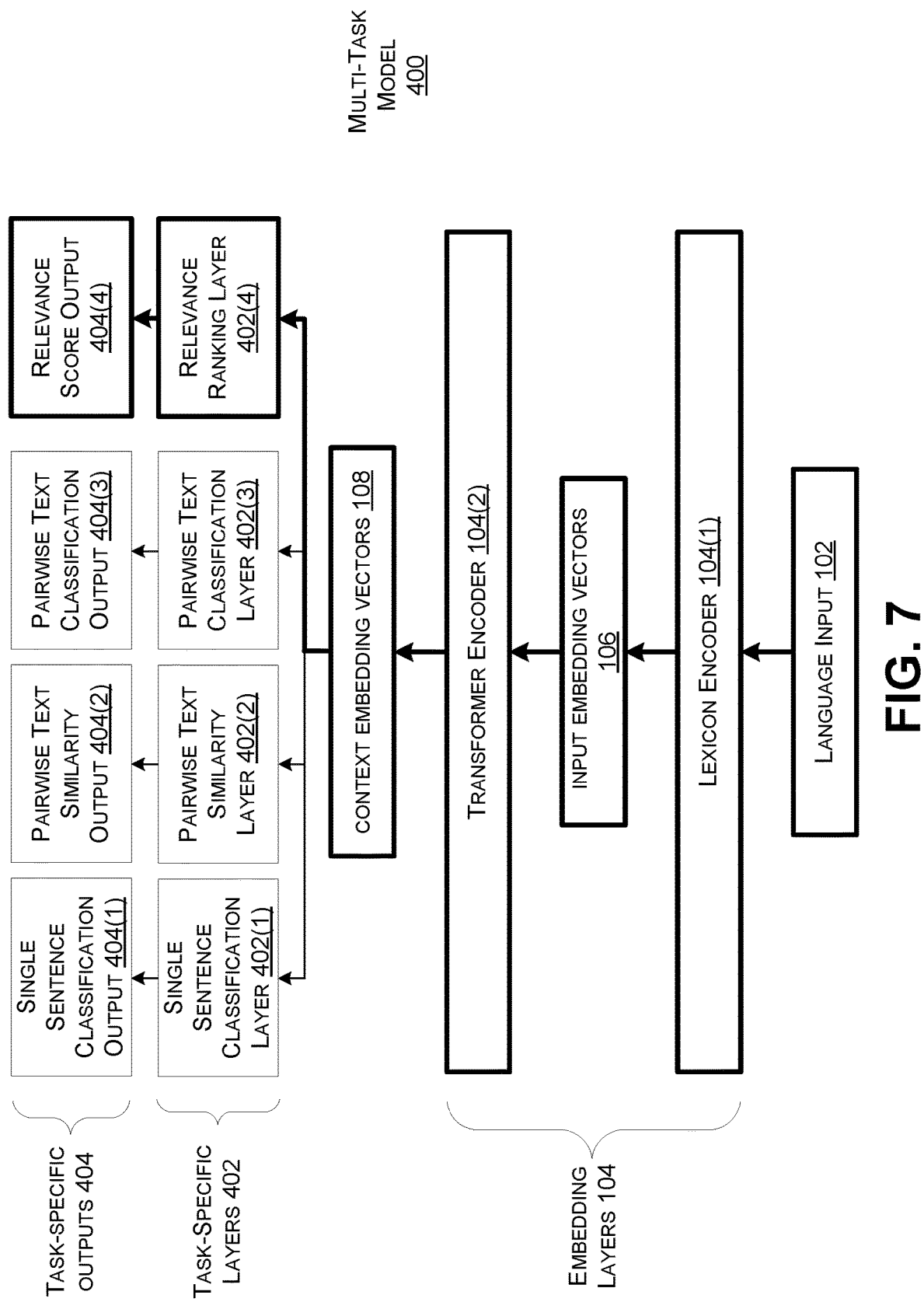

FIG. 7 shows how training can proceed with the fourth training data set, which can be used to train relevance ranking layer 402(4). Again, the components of multi-task natural language processing model 400 that are active during training using the fourth training data set are shown in bold. The fourth training data set is fed into the embedding layers 104, and the context embedding vectors 108 produced from the fourth training data set are used by relevance ranking layer 402(4) to produce relevance score output 404(4). Generally, the parameters of relevance ranking layer 402(4), lexicon encoder 104(1), and transformer encoder 104(2) can be updated using the disclosed adversarial regularization and proximal point mechanisms. Note that the other task specific layers, single sentence classification layer 402(1), pairwise text similarity layer (2), and pairwise text classification layer 402(3), are not updated using the fourth training data set.

In general, multi-task training tends to help prevent overfitting for several reasons. First, the shared layers can be trained using loss functions for different tasks. Second, the training data sets for each task may have different characteristics, e.g., words or tokens used in different contexts, different usage frequencies, etc. By using the disclosed adversarial regularization and proximal point mechanisms with task-specific training data for different tasks, multi-task models can be produced that generalize well for a variety of applications.

Example Labeled Sentiment Data and User Experience

The following description provides an example scenario to illustrate how the disclosed implementations can be employed to provide an improved user experience relative to conventional model training techniques. Specifically, the following description shows how training examples can lead to model overfitting and, consequently, incorrect application behavior. In addition, the following description shows how a model that is not overfit to the training data set can generalize more effectively and avoid pitfalls associated with overfitting.

Figure 8:
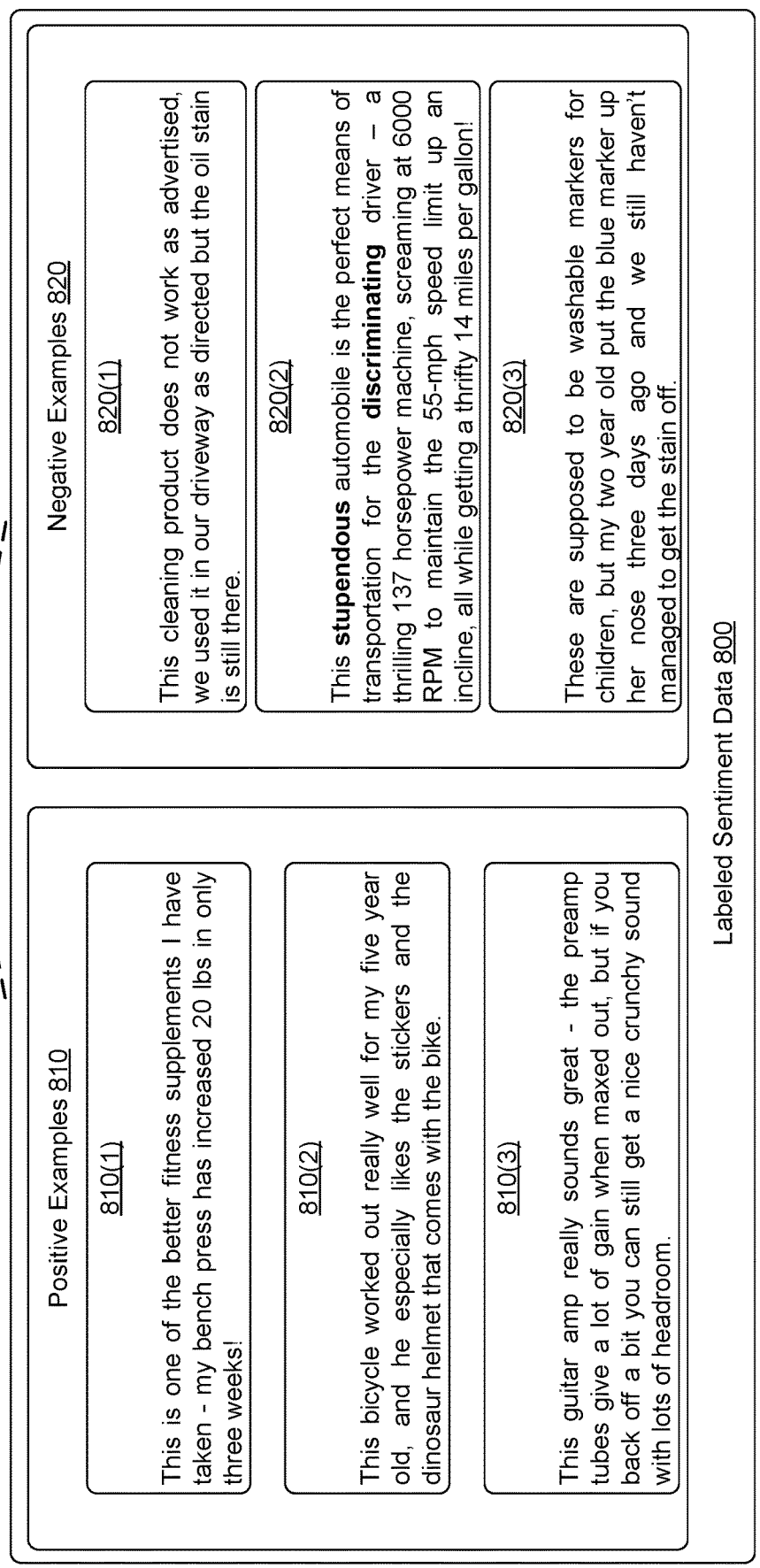
FIG. 8 illustrates examples of labeled task-specific training data, consistent with some implementations of the present concepts.

FIG. 8 shows an example of labeled sentiment data 800 that can be used to train a task-specific layer to perform classification of sentences for positive or negative sentiment. Labeled sentiment data can be provided in labeled task-specific examples 216 for use in training workflow 200, as described previously.

Labeled sentiment data includes positive examples 810 and negative examples 820. Each positive example 810 includes a label indicating that a human or automated agent has manually labeled that sentence as indicating a positive sentiment, and each negative example 820 includes a label indicating that a human or automated agent has manually labeled that sentence as indicating a negative sentiment.

Assume, for the purposes of example, that a model is trained on the labeled sentiment data 800 shown in FIG. 8 using traditional techniques that may tend to overfit the model to the underlying training data. In particular, note negative example 820(2). This example is written with a sarcastic tone describing some undesirable traits of a car—the reader knows that 137 horsepower, excessive engine speed to climb a hill, and 14 mpg are not desirable traits in an automobile. However, the terms used by the reviewer include "stupendous," which is typically a positive term being used in a negative way in this review. The reviewer also includes the term "discriminating" to describe the type of driver that should choose this car, but again this term ordinarily would imply a positive aspect of the car but is being used in a negative way.

Furthermore, note that the terms "stupendous" and "discriminating" may be used with relatively low frequency. As a consequence, these terms may not have many corresponding examples in the labeled sentiment data 800. As a result, traditional training techniques might overfit the model to this data set by predicting that reviews having one or both of these terms are negative reviews, when in fact these terms are generally used by humans to describe positive traits of a product or service.

Figure 9:
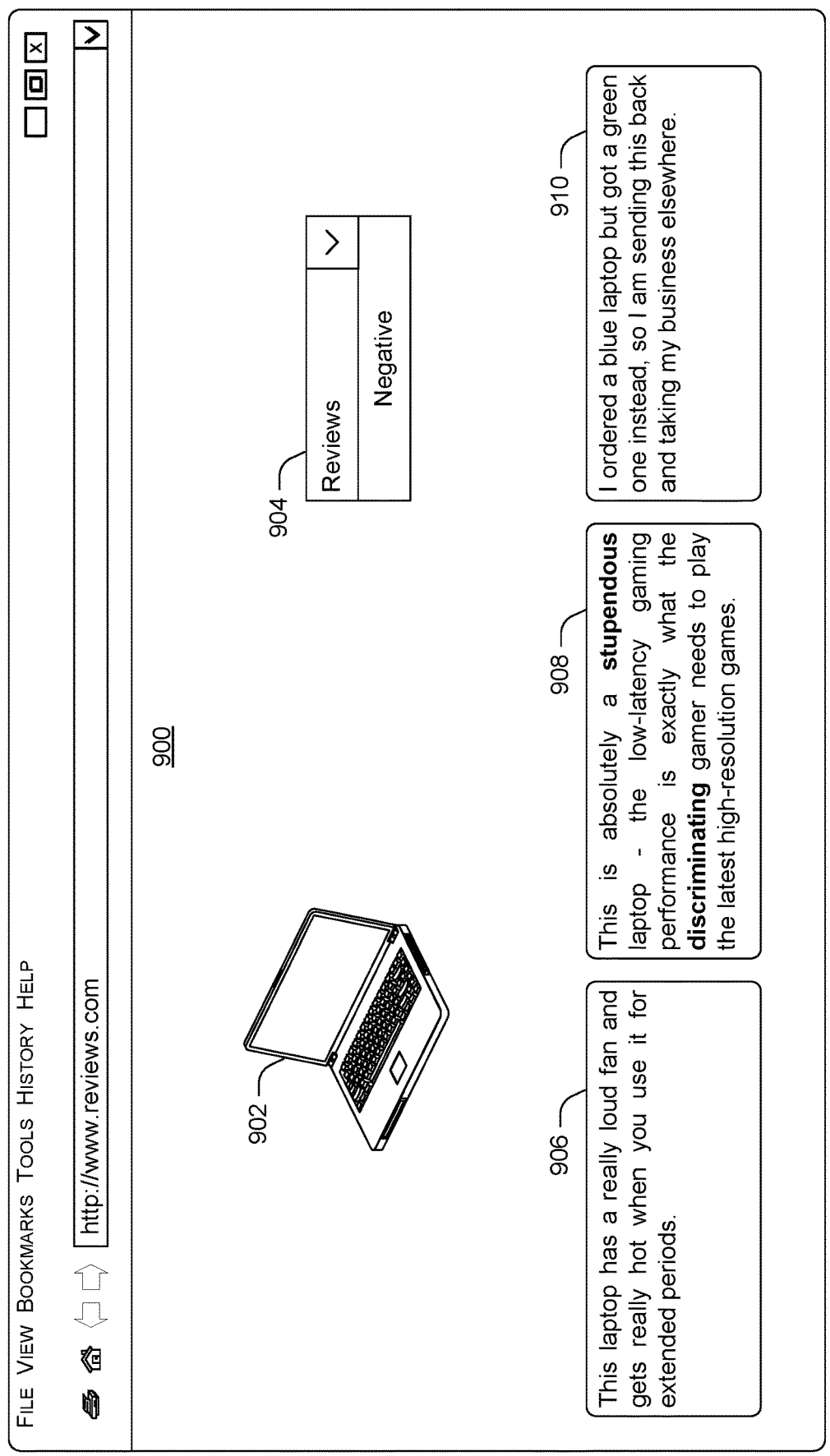
FIGS. 9 and 10 illustrate example graphical user interfaces that can be employed, consistent with some implementations of the present concepts.

FIG. 9 illustrates an example review page 900 for a laptop 902. Here, a user has selected to filter for negative reviews via a drop-down menu 904, and in response the review page shows three reviews, 906, 908, and 910. Review 906 and review 910 are clearly negative reviews and thus are appropriate to display to the user in response to their request for negative reviews. However, review 908 is a very positive review of the laptop, but includes the terms "stupendous" and "discriminating." A model that is overfit to the training data as described above could mischaracterize this review as negative if the model overfits the meaning of these terms to negative example 820(2).

Figure 10:
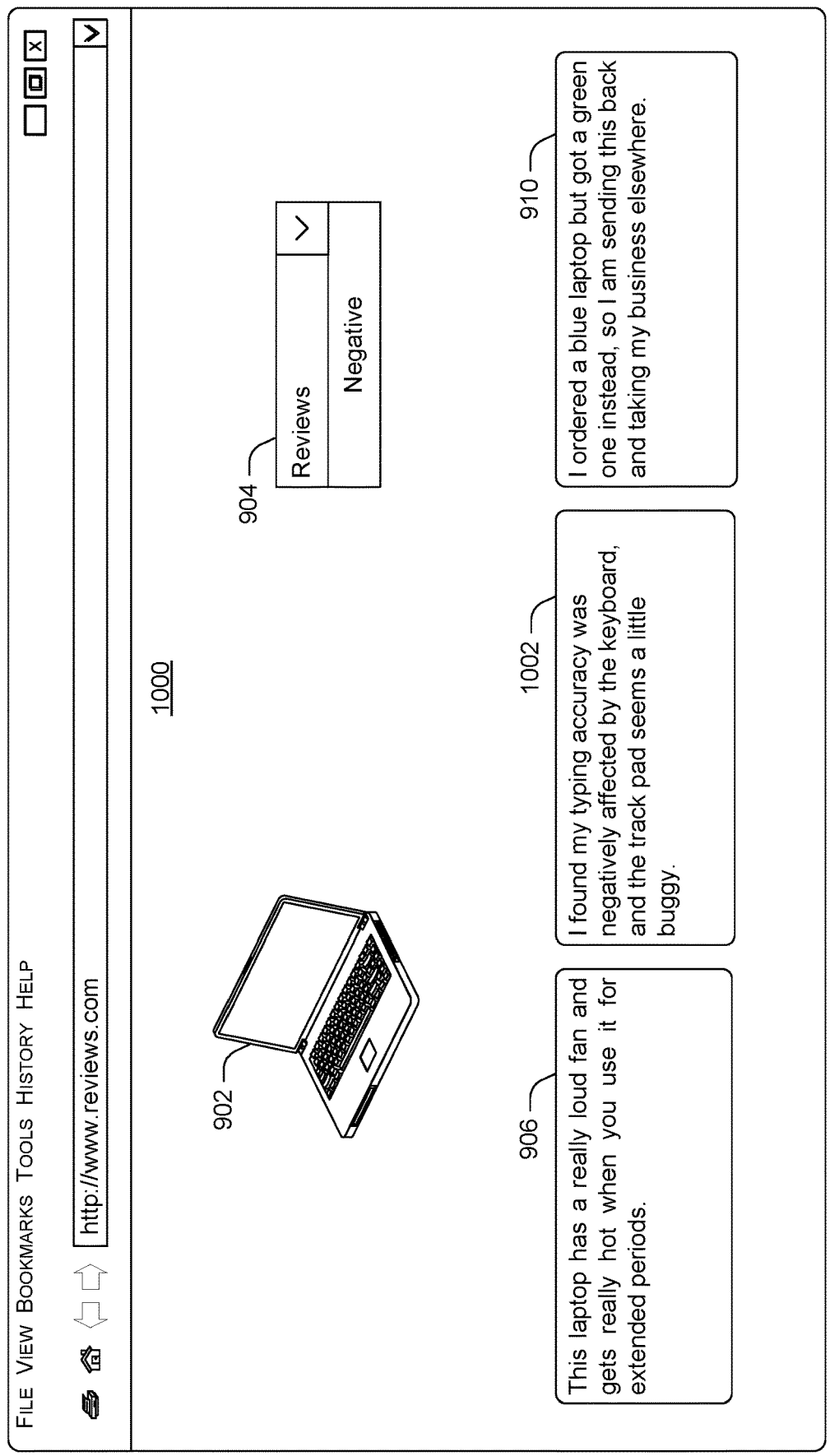

FIG. 10 illustrates an example review page 1000 for a laptop 902 that could be produced using the disclosed techniques. Here, review 908 has been replaced by review 1002, which is actually a negative review and thus correctly displayed to a user who wishes to see negative reviews for the laptop. Because the disclosed implementations can avoid overfitting to examples such as negative example 820(2), the disclosed implementations may correctly learn that the terms "stupendous" and "discriminating" are not strongly associated with negative reviews and accordingly do not misclassify review 908 as a negative review.

Applications

Generally, a trained model can be used to perform one or more tasks. In natural language processing scenarios, the trained model can be employed in a search engine, e.g., to match queries to documents or to determine the sentiment of a given query. As another example, the trained model can be used in a digital assistant or bot to rank candidate responses to user utterances. In an image processing context, the trained model could have task-specific layers to indicate whether certain classifications of objects are present in a given image, semantically label images, etc., as well as one or more shared convolutional layers.

In other applications, computer vision, radar, sonar, or other sensing tasks can be accomplished using machine learning models that are trained or tuned as described herein. In addition, the disclosed implementations can be employed in medical scenarios (e.g., regression learning for predicting drug efficacy), analysis of genetic markers, etc.

Furthermore, while the previous examples introduce the present concepts with pretraining of certain model layers via unsupervised learning, this is not an inherent limitation of the disclosed techniques. For instance, consider a scenario where there is a significant amount of manually labeled training data for a particular task, e.g., human-labeled images of animals where the labels correctly identify the species of the animals in the images, e.g., dog, cat, tiger, chicken, etc. Some or all layers of a model, such as convolutional or pooling layers, could be pretrained on this data set using supervised learning.

Subsequently, the model could be adapted to a different image processing task using the disclosed techniques. For instance, assume that limited labeled training data is available for images of dogs, where the labels are semantic labels that identify specific breeds of the dogs. The disclosed implementations could be employed by using a supervised learning process to pretrain the model using the species-labeled data set and using the disclosed adversarial regularization and proximal point update mechanisms as another supervised learning process to tune the model using the breed-labeled data set. Note that animals and breeds of dogs are just a few examples of different types of objects that can be classified by processing images using models trained according to the disclosed techniques.

Example System

Figure 11:
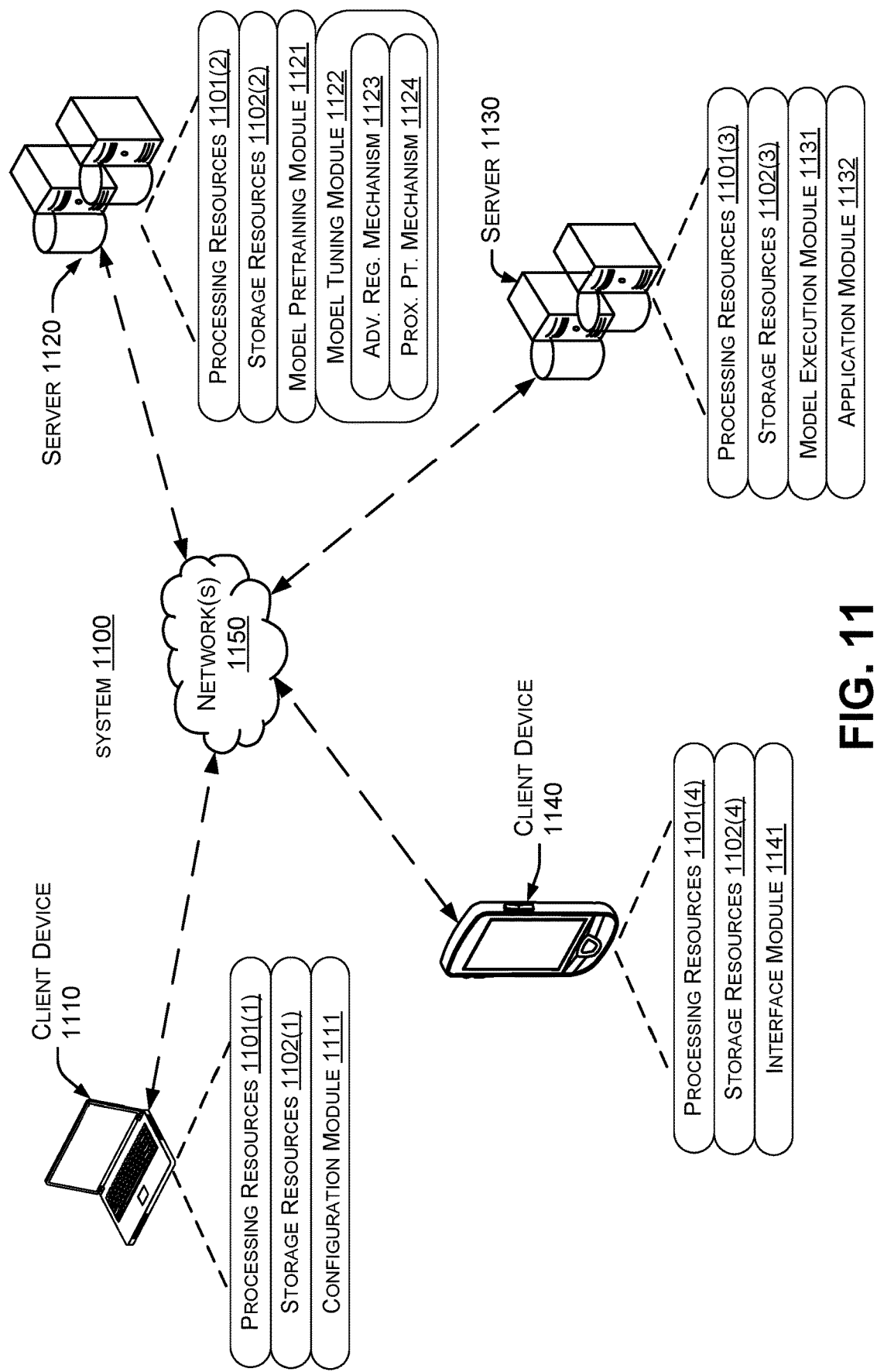
FIG. 11 illustrates an example system, consistent with some implementations of the present concepts.

The present implementations can be performed in various scenarios on various devices. FIG. 11 shows an example system 1100 in which the present implementations can be employed, as discussed more below.

As shown in FIG. 11, system 1100 includes a client device 1110, a server 1120, a server 1130, and a client device 1140, connected by one or more network(s) 1150. Note that the client devices can be embodied both as mobile devices such as smart phones and/or tablets as well as stationary devices such as desktops, server devices, etc. Likewise, the servers can be implemented using various types of computing devices. In some cases, any of the devices shown in FIG. 11, but particularly the servers, can be implemented in data centers, server farms, etc.

Certain components of the devices shown in FIG. 11 may be referred to herein by parenthetical reference numbers. For the purposes of the following description, the parenthetical (1) indicates an occurrence of a given component on client device 1110, (2) indicates an occurrence of a given component on server 1120, (3) indicates an occurrence on server 1130, and (4) indicates an occurrence on client device 1140. Unless identifying a specific instance of a given component, this document will refer generally to the components without the parenthetical.

Generally, the devices 1110, 1120, 1130, and/or 1140 may have respective processing resources 1101 and storage resources 1102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 1110 can include a configuration module 1111 that can interact with a model pretraining module 1121 and a model tuning module 1122 on server 1120. The model tuning module can provide an adversarial regularization mechanism 1123 and a proximal point update mechanism 1124. Generally speaking, the configuration module can provide certain configuration parameters to the model pretraining and tuning modules. The configuration parameters can include architecture parameters and training parameters. The architecture parameters can specify the structure of a machine learning model, e.g., the number of nodes, arrangement of the nodes in layers, connectivity of the nodes and/or layers, etc. The architecture parameters can also specify input data and output data for each node and/or layer.

The configuration parameters can also include training parameters that specify information such as learning rates, unsupervised learning parameters, unlabeled data sources, supervised learning parameters, labeled data sources, tuning parameters for adversarial regularization, and/or tuning parameters for proximal point updating. The model pretraining module 1121 and/or model tuning module 1122 can use these training configuration parameters to perform model training functionality on a model specified by the architecture parameters. As just one example, the configuration parameters can identify one or more unlabeled training data sources, such as one or more repositories of sentences that can be used for pretraining a language model using masked language prediction and/or next sentence prediction. As another example, the configuration parameters can identify one or more labeled training data sources, which can include task-specific training examples that are labeled by a human or separate machine-learning model.

The model tuning module 1122 can output a trained, final model to server 1130. Model execution module 1131 can execute the final model in response to received inputs. For example, the interface module 1141 on client device 1140 can provide input data to the model execution module for evaluation on any of the tasks provided in the task-specific layers. The model execution module can process the uploaded input data using the final model and provide model outputs in response by sending the model outputs to the client device 1140 over network(s) 1150.

In some instances, the server 1130 also includes an application module 1132 that interacts with the model execution module 1131. For instance, the application module can provide a search engine that uses the trained model to rank documents in response to queries provided by client device 1140, e.g., using relevance scores as described previously. As another example, the application module can provide a shopping service that allows users of client device 1140 to filter for negative or positive reviews based on review sentiment determined by the trained model, as described previously.

As another example, the application module 1132 can provide a crowdsourced image repository that allows users to search for pictures of specific dog breeds. The application module can call the model execution module 1131 to classify individual images based on dog breeds depicted therein, as described previously. In still further implementations, the application module can provide financial services, social media services, digital assistant services, etc., by calling machine learning models that have been trained using the disclosed techniques.

First Example Method

Figure 12:
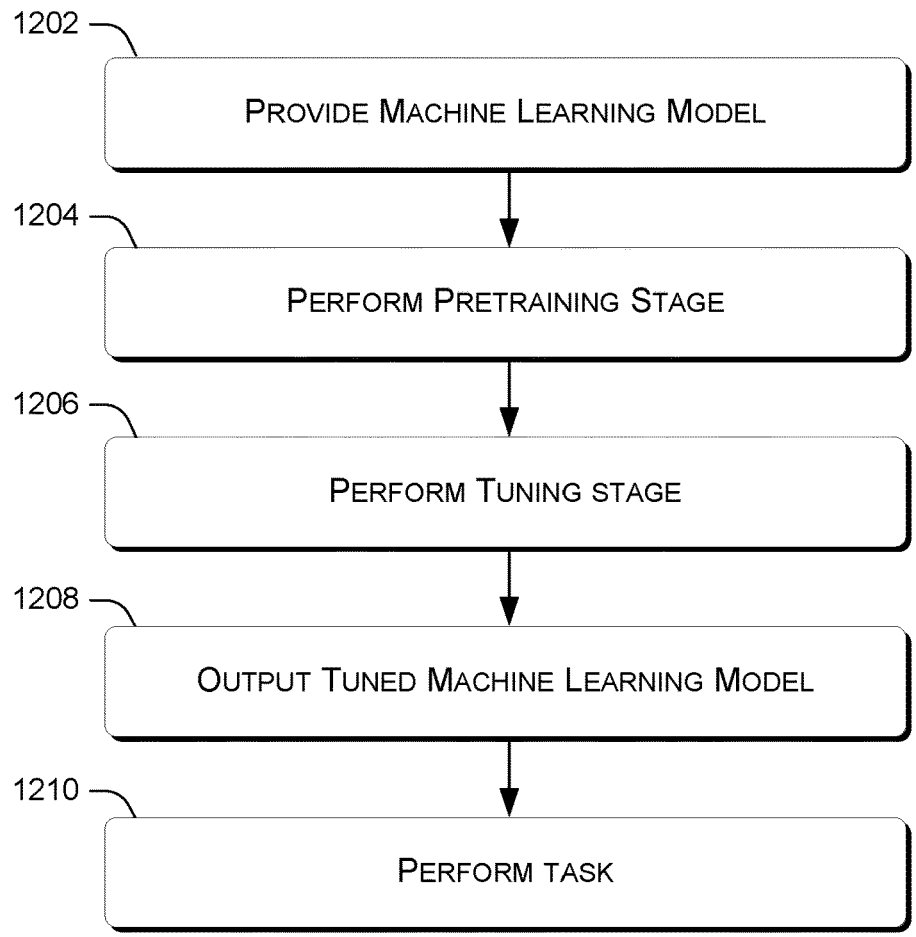
FIG. 12 illustrates an example method or technique for training and utilizing a machine learning model, consistent with some implementations of the present concepts.

FIG. 12 illustrates an example method 1200, consistent with the present concepts. As discussed in more below, method 1200 can be implemented on many different types of devices, e.g., by one or more cloud servers, by a client device such as a laptop, tablet, or smartphone, or by combinations of one or more servers, client devices, etc.

Method 1200 begins at block 1202, where a machine learning model is provided. For example, the machine learning model can be a neural network, such as discussed above. Note that block 1202 can involve generating an architecture (e.g., node structure, connections between nodes, etc.) of the machine learning model manually or using automated techniques. Alternatively, block 1202 can involve receiving the machine learning architecture from a remote device or via user input.

Method 1200 continues at block 1204, where a pretraining stage is performed on one or more first layers of the machine learning model, as also discussed above. In some implementations, blocks 1202 and 1204 can be combined by receiving a model having one or more layers that are already pretrained.

Method 1200 continues at block 1206, where a tuning stage is performed on the machine learning model, as also discussed in the attached appendices. In multi-task scenarios, the machine learning model can include one or more shared layers and multiple task-specific layers.

Method 1200 continues at block 1208, where a tuned machine learning model is output. The tuned machine learning model can have parameters that are adapted to one or more tasks during the tuning stage.

Method 1200 continues at block 1210, where a particular task is performed using the tuned machine learning model, as also discussed above.

Second Example Method

Figure 13:
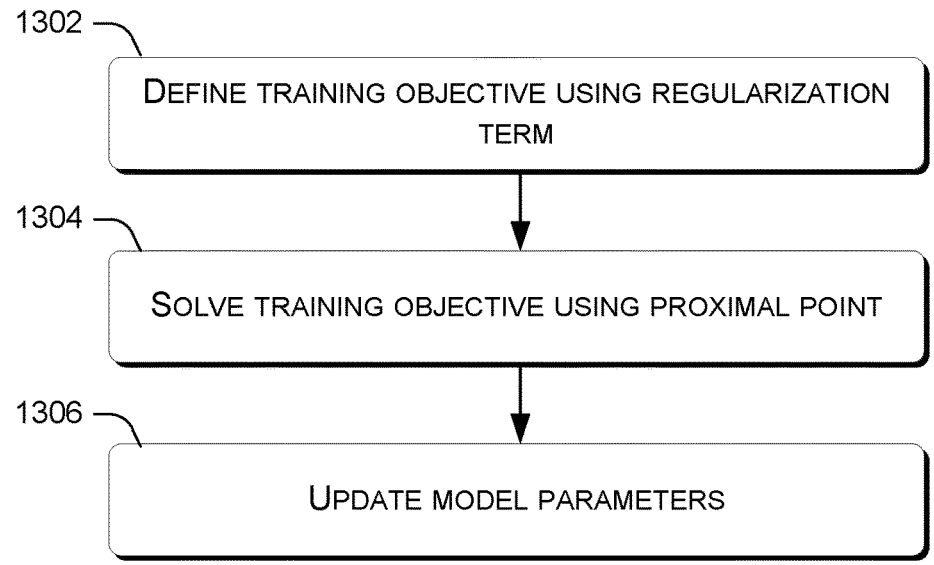
FIG. 13 illustrates an example method or technique for training a machine learning model, consistent with some implementations of the present concepts.

FIG. 13 illustrates an example method 1300, consistent with the present concepts. As discussed in more below, method 1300 can be implemented on many different types of devices, e.g., by one or more cloud servers, by a client device such as a laptop, tablet, or smartphone, or by combinations of one or more servers, client devices, etc. Generally speaking, method 1300 be employed to tune a pre-trained machine learning model (e.g., in block 1206 of method 1200), and/or to train a machine learning model from scratch.

Method 1300 begins at block 1302, where a training objective with a regularization term is defined, such as symmetrized KL-divergence as discussed above. A symmetrized model output divergence such as this can measure the divergence in a first and second output distribution produced by a model, where the second output distribution is computed by adding noise to inputs used to generate the first output distribution. In other words, the symmetrized model output divergence measure reflects deviations in model output of the machine learning model caused by adding noise to the model inputs.

Method 1300 continues at block 1304, where the training objective is solved using a proximal point technique, as discussed above. In some implementations, the proximal point technique uses a model parameter divergence measure that reflects the divergence between model parameters (e.g., neural network weights) of an updated model and a model from a previous iteration. More specifically, the model parameter divergence measure can be proportional to a difference between output of a current iteration of the model and output of at least one previous iteration of the model over a batch of training inputs. By updating the model parameters at each tuning iteration using the proximal point technique, each model update disfavors new models with large deviations in model parameters relative to previous iterations.

Method 1300 continues at block 1306, where model parameters are updated based on the solution produced at block 1304. In some cases, method 1300 is performed iteratively, e.g., blocks 1304 and 1306 can be performed multiple times (e.g., over different batches of training data) until a stopping condition is reached, at which point a final, trained model can be output.

Experimental Results

The disclosed techniques were employed to train several single-task models using an architecture similar to that shown in FIG. 1, and evaluated at using GLUE benchmarks, available gluebenchmark.com. The following table provides results for $SMART_{BERT}$, which is a BERT-based model tuned using the disclosed techniques, $SMART_{RoBERTa}$, which is a RoBERTa-based model tuned using the disclosed techniques, as well as several other recently reported results for other models for comparison purposes:

| Model | MNLI-/mm Acc | QQP Acc/F1 | RTE Acc | QNLI Acc | MRPC Acc/F1 | CoLA Mcc | SST Acc | STS-B P/S Corr |
|---|---|---|---|---|---|---|---|---|
| BERT BASE | | | | | | | | |
| BERT | 84.4/— | — | — | 88.4 | —/86.7 | — | 92.7 | — |
| $BERT_{ReImp}$ | 84.5/84.4 | 90.9/88.3 | 63.5 | 91.1 | 84.1/89.0 | 54.7 | 92.9 | 89.2/88.8 |
| $SMART_{BERT}$ | 85.6/86.0 | 91.5/88.5 | 71.2 | 91.7 | 87.7/91.3 | 59.1 | 93.0 | 90.0/89.4 |
| RoBERTa LARGE | | | | | | | | |
| RoBERTa | 90.2/— | 92.2/— | 86.6 | 94.7 | —/90.9 | 68.0 | 96.4 | 92.4/— |
| PGD | 90.5/— | 92.5/— | 87.4 | 94.9 | —/90.9 | 69.7 | 96.4 | 92.4/— |
| FreeAT | 90.0/— | 92.5/— | 86.7 | 94.7 | —/90.7 | 68.8 | 96.1 | 92.4/— |
| FREELB | 90.6/— | 92.6/— | 88.1 | 95.0 | —/91.4 | 71.1 | 96.7 | 92.7/— |
| $SMART_{RoBERTa}$ | 91.1/91.3 | 92.4/89.8 | 92.0 | 95.6 | 89.2/92.1 | 70.6 | 96.9 | 92.8/92.6 |

The disclosed techniques were also employed to train several multi-task models using an architecture similar to that shown in FIGS. 4-7, and also evaluated using the GLUE benchmarks. The following table provides results for SMART-MT-$DNN_{v0}$ and SMART-MT-DNN, which were trained using the disclosed techniques, as well as several other recently reported results for other models for comparison purposes. SMART-MT-$DNN_{v0}$ is a model that was pretrained as a multi-task model using labeled training data for different tasks, and subsequently tuned using the disclosed adversarial regularization and proximal point mechanisms. SMART-MT-DNN is multi-task model where multi-task learning was performed together with the disclosed adversarial regularization and proximal point mechanisms.

| Model | MNLO Acc | RTE Acc | QNLI Acc | SST Acc | MRPC F1 |
|---|---|---|---|---|---|
| BERT | 84.5 | 63.5 | 91.1 | 92.9 | 89.0 |
| MT-DNN | 85.3 | 79.1 | 91.5 | 93.6 | 89.2 |
| SMART | 85.6 | 71.2 | 91.6 | 93.0 | 91.3 |
| SMART-MT-$DNN_{v0}$ | 85.7 | 80.2 | 92.0 | 93.3 | 91.5 |
| SMART-MT-DNN | 85.7 | 81.2 | 92.0 | 93.5 | 91.7 |

In the tables above, MLNI refers to Multi-genre Natural Language Inference, and is a data set with sentence pairs annotated for textual entailment relationships. QQP refers to Quora Question Pairs, which is a dataset of question pairs annotated to indicate whether the questions duplicate the meaning of each other. RTE refers to Recognizing Textual Entailment, which is a dataset of sentences labeled to indicate whether the meaning of one sentence can be inferred from the other. QNLI refers to a question-answering dataset with questions and corresponding answers to the questions that are identified in spans of text provided in the dataset. MPRC refers to Microsoft Research Paraphrase Corpus, a dataset of sentences labeled with paraphrase relationships indicating whether one sentence accurately paraphrases another. CoLA refers to Corpus of Linguistic Acceptability, which is a dataset of sentences labeled for grammatical acceptability. SST refers to Stanford Sentiment Treebank, which is a dataset of examples labeled with positive or negative sentiments expressed by the examples. STS-B refers to Semantic Textual Similarity Benchmark, which is a dataset with labels indicating similarity between two sentences.

Device Implementations

As noted above with respect to FIG. 11, system 1100 includes several devices, including a client device 1110, a server 1120, a server 1130, and a client device 1140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1150. Without limitation, network(s) 1150 can include one or more local area networks (LANs), wide area networks (WANs), the Internet, and the like.

Various device examples are described above. Additional examples are described below. One example includes a method performed on a computing device, the method comprising: providing a machine learning model having one or more layers and associated parameters, performing a pretraining stage on the parameters of the machine learning model to obtain pretrained parameters, and performing a tuning stage on the machine learning model by using labeled training samples to tune the pretrained parameters. The tuning stage includes performing noise adjustment of the labeled training samples to obtain noise-adjusted training samples and adjusting the pretrained parameters based at least on the labeled training samples and the noise-adjusted training samples to obtain adapted parameters. The method comprises outputting a tuned machine learning model having the adapted parameters.

Another example can include any of the above and/or below examples where the adjusting comprises computing a loss function comprising a first term that is proportional to a difference between predictions of the machine learning model and labels of the labeled training samples and a second term that is proportional to a difference between output of the machine learning model for the labeled training samples and output of the machine learning model for the noise-adjusted training samples.

Another example can include any of the above and/or below examples where the tuning stage comprises multiple tuning iterations, the method further comprising determining a difference between output of a current iteration of the machine learning model and output of at least one previous iteration of the machine learning model and constraining the adjusting of the parameters based at least on the difference.

Another example can include any of the above and/or below examples where the adjusting comprises performing adversarial regularization based at least on the noise-adjusted training samples and performing proximal point updating of the parameters based at least on the difference.

Another example can include any of the above and/or below examples where the method further comprises after the tuning stage, performing a particular task on input data using the tuned machine learning model.

Another example can include any of the above and/or below examples where the machine learning model comprises one or more embedding layers and at least one task-specific layer.

Another example can include any of the above and/or below examples where the one or more embedding layers comprise a lexicon encoder or a transformer encoder.

Another example can include any of the above and/or below examples where the pretraining stage comprises unsupervised learning of the parameters of the one or more embedding layers.

Another example can include any of the above and/or below examples where the tuning stage adjusts the parameters of the one or more embedding layers and the parameters of the task-specific layer.

Another example can include any of the above and/or below examples wherein the task-specific layer is selected from group comprising a single-sentence classification layer, a pairwise text similarity layer, a pairwise text classification layer, and a pairwise ranking layer.

Another example includes a system comprising a hardware processing unit and a storage resource storing computer-readable instructions which, when executed by the hardware processing unit, cause the hardware processing unit to: receive input data, process the input data using a machine learning model having a first layer and a second layer to obtain a result, the first layer having been pretrained in a pretraining stage, the first layer and the second layer having been tuned together using virtual adversarial regularization, and output the result.

Another example can include any of the above and/or below examples where the input data comprises a query and a document, and the result characterizes similarity of the query to the document.

Another example can include any of the above and/or below examples where the input data comprises a sentence and the result characterizes a sentiment of the sentence.

Another example can include any of the above and/or below examples where the input data comprises an image and the result characterizes an object that is present in the image.

Another example can include any of the above and/or below examples where the computer-readable instructions, when executed by the hardware processing unit, cause the hardware processing unit to pretrain the first layer using unsupervised learning and tune the first layer and the second layer using virtual adversarial regularization.

Another example can include any of the above and/or below examples where the computer-readable instructions, when executed by the hardware processing unit, cause the hardware processing unit to tune the first layer and the second layer using a proximal point mechanism.

Another example includes a system comprising a hardware processing unit and a storage resource storing computer-readable instructions which, when executed by the hardware processing unit, cause the hardware processing unit to obtain a machine learning model and perform a supervised learning process on the machine learning model, the supervised learning process comprising adjusting parameters of the machine learning model based at least on training loss over labeled training samples, the labeled training samples comprising model inputs and corresponding labels and deviations in model output of the machine learning model caused by adding noise to the model inputs.

Another example can include any of the above and/or below examples where the computer-readable instructions, when executed by the hardware processing unit, cause the hardware processing unit to estimate an adversarial direction in which to add the noise and wherein the adversarial direction for a particular input is a direction in which adding noise to the particular input causes greatest deviation in the model output.

Another example can include any of the above and/or below examples where the machine learning model comprises a layer that outputs word or token embeddings, and the computer-readable instructions, when executed by the hardware processing unit, cause the hardware processing unit to add the noise to the word or token embeddings.

Another example can include any of the above and/or below examples where the supervised learning process further comprises adjusting the parameters based at least on deviations in model output of a current iteration of the machine learning model relative to model output of at least one previous iteration of the machine learning model.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   obtaining a machine learning model having one or more embedding layers and pretrained parameters;
   performing a tuning stage on the machine learning model by using labeled training samples to tune the pretrained parameters, the tuning stage including:
      performing noise adjustment by adding noise to embeddings produced by the one or more embedding layers that represent text of the labeled training samples to obtain noise-adjusted embeddings, and
      adjusting the pretrained parameters to obtain adapted parameters, the adjusting being based at least on a difference between first output distributions determined by the machine learning model using the embeddings representing the text of the labeled training samples and second output distributions determined by the machine learning model using the noise-adjusted embeddings, wherein the first output distributions and the second output distributions are output by the machine learning model and include different values corresponding to different likelihoods that a particular labeled training sample has a particular label; and
   outputting a tuned machine learning model, the tuned machine learning model being an instance of the machine learning model having the adapted parameters.

2. The method of claim 1, wherein the adjusting comprises computing a loss function comprising:
   a first term that is proportional to a difference between predictions of the machine learning model determined using the embeddings and labels of the labeled training samples, and
   a second term that is proportional to the difference between the first output distributions determined by the machine learning model using the embeddings and the second output distributions determined by the machine learning model using the noise-adjusted embeddings.

3. The method of claim 1, wherein the tuning stage comprises multiple tuning iterations, the method further comprising:
   determining a difference between first parameters of a first tuning iteration of the machine learning model and second parameters of a second tuning iteration of the machine learning model; and constraining the adjusting of third parameters of a third tuning iteration of the machine learning model by imposing a penalty that is calculated based at least on the difference between the first parameters and the second parameters.

4. The method of claim 1, further comprising:

after the tuning stage, performing a particular task on input data using the tuned machine learning model.

5. The method of claim 1, wherein the tuned machine learning model comprises at least one task-specific layer.

6. The method of claim 5, wherein the one or more embedding layers comprise a lexicon encoder or a transformer encoder.

7. The method of claim 5, wherein the one or more embedding layers have been pretrained using unsupervised learning prior to the obtaining.

8. The method of claim 7, wherein the tuning stage adjusts the parameters of the one or more embedding layers and the parameters of the task-specific layer.

9. The method of claim 8, wherein the task-specific layer comprises multiple task-specific layers including at least a single-sentence classification layer, a pairwise text similarity layer, a pairwise text classification layer, and a pairwise ranking layer.

10. The method of claim 1, wherein the tuned machine learning model comprises a sentiment classification layer and:

the first output distributions comprise, for the particular labeled training sample, a first value reflecting a likelihood that the particular labeled training sample has a positive sentiment and a second value reflecting a likelihood that the particular labeled training sample has a negative sentiment, the first and second values being determined by the sentiment classification layer based at least on one or more particular embeddings determined by the one or more embedding layers for the particular labeled training sample, and the second output distributions comprise, for the particular labeled training sample, a third value reflecting a likelihood that the particular labeled training sample has a positive sentiment and a fourth value reflecting a likelihood that the particular labeled training sample has a negative sentiment, the third and fourth values being determined by the sentiment classification layer based at least on one or more particular noise-adjusted embeddings obtained by adding noise to the one or more particular embeddings.

11. The method of claim 1, wherein the first output distribution includes different first classification likelihoods for different potential classifications of the particular labeled training sample, the second output distribution includes different second classification likelihoods for the different potential classifications of the particular labeled training sample, the different first classification likelihoods being determined using one or more particular embeddings representing the particular labeled training sample and the different second classification likelihoods being determined using one or more particular noise-adjusted embeddings obtained by adding noise to the one or more particular embeddings.

12. The method of claim 1, the first output distributions and the second output distributions being output by the same machine learning model during the tuning stage.

13. The method of claim 1, the first output distributions and the second output distributions being output by a single machine learning model during the tuning stage.

14. The method of claim 13, the embeddings being sentence embeddings representing multi-word natural language sentences in the labeled training samples, the noise-adjusted embeddings being obtained by adding noise to the sentence embeddings.

15. A system comprising:

a hardware processing unit; and a storage resource storing computer-readable instructions which, when executed by the hardware processing unit, cause the hardware processing unit to:

receive input data;

process the input data using a machine learning model having an embedding layer and a task-specific layer to obtain a result, the embedding layer having been pretrained in a pretraining stage, the embedding layer and the task-specific layer having been tuned together based at least on a difference between first output distributions determined by the machine learning model using embeddings representing text of labeled training samples and second output distributions determined by the machine learning model using noise-adjusted embeddings obtained by adding noise to the embeddings, wherein the first output distributions and the second output distributions are output by the machine learning model during tuning and include different values corresponding to different likelihoods that a particular labeled training sample has a particular label; and output the result.

16. The system of claim 15, wherein the input data comprise a query and a document, and the result characterizes similarity of the query to the document.

17. The system of claim 15, wherein the input data comprise a sentence and the result characterizes a sentiment of the sentence.

18. The system of claim 15, wherein the input data comprise an image and the result characterizes an object that is present in the image.

19. The system of claim 15, wherein the computer-readable instructions, when executed by the hardware processing unit, cause the hardware processing unit to:

tune the embedding layer and the task-specific layer using virtual adversarial regularization.

20. The system of claim 19, wherein the computer-readable instructions, when executed by the hardware processing unit, cause the hardware processing unit to:

tune the embedding layer and the task-specific layer using a proximal point mechanism.

21. A system comprising:

a hardware processing unit; and a storage resource storing computer-readable instructions which, when executed by the hardware processing unit, cause the hardware processing unit to:

obtain a machine learning model having a pretrained embedding layer; and perform a supervised learning process on the machine learning model, the supervised learning process comprising adjusting parameters of the machine learning model based at least on:

training loss over labeled training samples, the labeled training samples comprising model inputs and corresponding labels, and a difference between first output distributions determined by the machine learning model using embeddings produced by the pretrained embedding layer for the labeled training samples and second output distributions determined by the machine learning model using noise-adjusted embeddings obtained by adding noise to the embeddings, wherein the first output distributions and the second output distributions are output by the machine learning model and include different values corresponding to different likelihoods that a particular labeled training sample has a particular label.

22. The system of claim 21, wherein the computer-readable instructions, when executed by the hardware processing unit, cause the hardware processing unit to:
  estimate an adversarial direction in which to add the noise to the embeddings; and
  add the noise to the embeddings in the adversarial direction,
  wherein the adversarial direction for a particular embedding is a direction in which adding the noise to the particular embedding causes greatest deviation in output of the machine learning model.

23. The system of claim 21, wherein the pretrained embedding layer comprises a lexicon encoder, the machine learning model further comprises a transformer encoder, and the supervised learning process further comprises adjusting the parameters based at least on deviations in parameters of a current iteration of the machine learning model relative to parameters of at least one previous iteration of the machine learning model.

* * * * *